United States Patent
Matsuda et al.

(10) Patent No.: US 11,220,298 B2
(45) Date of Patent: Jan. 11, 2022

(54) LOWER VEHICLE-BODY STRUCTURE OF ELECTRIC VEHICLE

(71) Applicant: MAZDA MOTOR CORPORATION, Hiroshima (JP)

(72) Inventors: Yamato Matsuda, Hiroshima (JP); Nobuyuki Nakayama, Aki-gun (JP); Morihide Yamada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 151 days.

(21) Appl. No.: 16/820,443

(22) Filed: Mar. 16, 2020

(65) Prior Publication Data

US 2020/0361542 A1 Nov. 19, 2020

(30) Foreign Application Priority Data

May 15, 2019 (JP) .............................. JP2019-092092

(51) Int. Cl.
*B60J 7/00* (2006.01)
*B62D 25/20* (2006.01)
*B60K 1/04* (2019.01)
*B62D 21/15* (2006.01)
*B62D 27/02* (2006.01)

(52) U.S. Cl.
CPC ............ *B62D 25/2036* (2013.01); *B60K 1/04* (2013.01); *B62D 21/155* (2013.01); *B60K 2001/0427* (2013.01); *B62D 27/023* (2013.01)

(58) Field of Classification Search
CPC ........... B60W 10/06; B60W 2540/103; B60W 10/08; F16H 59/20; Y02T 10/62; B60R 19/18; B60R 19/34; B60R 2019/1813; B60R 2019/182; B60R 19/24
See application file for complete search history.

(56) References Cited

U.S. PATENT DOCUMENTS 4,557,519 A * 12/1985 Matsuura ........... B62D 25/2027
296/187.11
8,292,356 B2 * 10/2012 Ishigame ............... B60N 2/005
296/203.01
10,150,514 B2 * 12/2018 Kabayama ............. B62D 21/10
(Continued)

FOREIGN PATENT DOCUMENTS

JP 2013-147137 A 8/2013
JP WO2012/063393 A1 5/2014

*Primary Examiner* — Kiran B Patel
(74) *Attorney, Agent, or Firm* — Studebaker & Brackett PC

(57) ABSTRACT

A lower vehicle-body structure of an electric vehicle that can ensure desired resistance to rear-end collision even if a tunnel of a front floor panel is eliminated. The lower vehicle-body structure of the electric vehicle includes a pair of left and right side sills; a substantially flat front floor panel; a first floor cross member and a second floor cross member connecting the left and right side sills in a vehicle-width direction. The lower vehicle-body structure further includes a kick-up portion raised from a rear end of the front floor panel toward a vehicle upper side; a rear floor panel connected to a vehicle rear side of the kick-up portion; and a kick-up reinforcing element connecting a substantial middle of the kick-up portion in the vehicle-width direction and the front floor panel in front of the substantial middle of the kick-up portion.

8 Claims, 13 Drawing Sheets

(56) References Cited

U.S. PATENT DOCUMENTS

| | | | |
|---|---|---|---|
| 2006/0087109 A1* | 4/2006 | Kusu | B60K 15/063 |
| | | | 280/831 |
| 2007/0126264 A1* | 6/2007 | Mizuma | B60N 2/015 |
| | | | 296/204 |
| 2010/0156146 A1* | 6/2010 | Matsuyama | B62D 25/2036 |
| | | | 296/193.07 |
| 2013/0229030 A1* | 9/2013 | Yamaguchi | B60L 50/66 |
| | | | 296/193.07 |
| 2016/0207572 A1* | 7/2016 | Natsume | B62D 25/20 |
| 2019/0009833 A1* | 1/2019 | Yamagishi | B62D 27/02 |
| 2020/0282816 A1* | 9/2020 | Matsuda | B62D 21/157 |
| 2020/0361534 A1* | 11/2020 | Matsuda | B62D 25/145 |
| 2020/0361535 A1* | 11/2020 | Matsuda | B62D 21/04 |
| 2020/0361541 A1* | 11/2020 | Matsuda | B62D 27/023 |
| 2020/0376947 A1* | 12/2020 | Yamada | B62D 25/20 |
| 2020/0376948 A1* | 12/2020 | Yamada | H01M 50/20 |
| 2020/0381686 A1* | 12/2020 | Yamada | B60L 50/64 |
| 2020/0385056 A1* | 12/2020 | Kubota | B62D 21/157 |
| 2020/0385058 A1* | 12/2020 | Kubota | B62D 21/02 |
| 2020/0385059 A1* | 12/2020 | Kubota | B62D 21/152 |

\* cited by examiner

LOWER VEHICLE-BODY STRUCTURE OF ELECTRIC VEHICLE

BACKGROUND

Technical Field

The present disclosure relates to a lower vehicle-body structure of an electric vehicle, for example, including no exhaust pipe on a vehicle lower side of a front floor panel.

Background Art

Recently, there has been a growth in the use of electric vehicles that use output from a rotary electric machine as a drive force, instead of an internal combustion engine using gasoline or the like as fuel. In such an electric vehicle, an on-vehicle battery that supplies power to the rotary electric machine is disposed, for example, on a vehicle lower side of a front floor panel that forms a vehicle interior floor surface, as described, for example, in International Publication No. WO2012/063393 and Japanese Patent Laid-Open No. 2013-147137.

International Publication No. WO2012/063393 discloses a vehicle-body structure in which a floor cross member disposed on an upper surface of a front floor panel and connecting left and right side sills in a vehicle-width direction is disposed across a tunnel provided substantially at a middle of the front floor panel in the vehicle-width direction. Japanese Patent Laid-Open No. 2013-147137 discloses a vehicle-body structure in which a floor cross member disposed on an upper surface of a front floor panel and connecting left and right side sills in a vehicle-width direction is disposed across a tunnel provided substantially at a middle of the front floor panel in the vehicle-width direction.

In International Publication No. WO2012/063393 and Japanese Patent Laid-Open No. 2013-147137, the tunnel protruding toward a vehicle upper side and extending in a vehicle front-rear direction is formed substantially at the middle of the front floor panel in the vehicle-width direction. Such a tunnel of the front floor panel is conventionally used as a space in which an exhaust pipe is disposed that discharges exhaust gas generated in an internal combustion engine from a vehicle rear part to outside, and is unnecessary for an electric vehicle that requires no exhaust pipe.

Further, for the electric vehicle that requires no exhaust pipe, there is an expectation for a reduction in vehicle weight and an increase in space under occupant's feet by eliminating the tunnel.

Thus, for the electric vehicle that requires no exhaust pipe, it is considered to eliminate the tunnel used as a space in which the exhaust pipe is disposed, and to form a vehicle interior floor surface from a relatively flat front floor panel and a floor cross member.

However, the conventional tunnel is connected to a rear part of the front floor panel and also functions as a support that supports a kick-up portion raised toward the vehicle upper side, and thus eliminating the tunnel of the front floor panel may reduce rigidity of the kick-up portion. Thus, when a collision load is applied from a vehicle rear side, a rear floor panel connected to a rear side of the kick-up portion may be deformed to curve toward the vehicle upper side around a lower end of the kick-up portion, thereby preventing desired resistance to rear-end collision from being ensured.

In view of the above described problems, the present disclosure provides a lower vehicle-body structure of an electric vehicle that can ensure desired resistance to rear-end collision even if a tunnel of a front floor panel is eliminated.

SUMMARY

The present disclosure provides a lower vehicle-body structure of an electric vehicle that uses output from a rotary electric machine as a drive force, including a pair of left and right side sills extending in a vehicle front-rear direction; a substantially flat front floor panel disposed between the side sills; and a floor cross member disposed on an upper surface of the front floor panel and connecting the left and right side sills in a vehicle-width direction. The lower vehicle-body structure further includes a pair of left and right floor frames disposed on the front floor panel and extending in the vehicle front-rear direction; a battery unit disposed between the left and right floor frames and on a vehicle lower side of the front floor panel; a kick-up portion raised from a rear end of the front floor panel toward a vehicle upper side; a rear floor panel connected to a vehicle rear side of the kick-up portion; and a kick-up reinforcing portion connecting a substantial middle of the kick-up portion in the vehicle-width direction and the front floor panel in front of the substantial middle of the kick-up portion. The substantially flat front floor panel is a floor panel including no tunnel protruding toward the vehicle upper side and extending in the vehicle front-rear direction.

The present disclosure can ensure desired resistance to rear-end collision even if the tunnel of the front floor panel is eliminated.

Specifically, the lower vehicle-body structure of the electric vehicle includes the kick-up reinforcing portion connecting the kick-up portion and the front floor panel for reinforcement, thereby increasing support rigidity of the kick-up portion against a load in the vehicle front-rear direction even if the tunnel is eliminated.

Thus, the lower vehicle-body structure of the electric vehicle can prevent the rear floor panel from being deformed to curve toward the vehicle upper side around a lower end of the kick-up portion when a collision load is applied from the vehicle rear side. Thus, the lower vehicle-body structure of the electric vehicle can ensure desired resistance to rear-end collision even if the tunnel of the front floor panel is eliminated.

Further, the lower vehicle-body structure of the electric vehicle includes the floor cross member connecting the left and right side sills in the vehicle-width direction, and thus can efficiently transfer, from one side sill to the other side sill, a collision load from a vehicle lateral side. Thus, the lower vehicle-body structure of the electric vehicle can increase rigidity of a vehicle interior floor surface against the collision load from the vehicle lateral side.

As an aspect of the present disclosure, the kick-up reinforcing portion may integrally include a pair of left and right side walls facing each other in the vehicle-width direction, a front wall connecting front ends of the side walls, and an upper surface connecting upper ends of the side walls, and the side walls and the front wall of the kick-up reinforcing portion may be joined to the front floor panel. According to the present disclosure, the lower vehicle-body structure of the electric vehicle can stably ensure desired resistance to rear-end collision.

Specifically, the kick-up reinforcing portion includes the pair of left and right side walls, the front wall, and the upper surface, and thus the lower vehicle-body structure of the electric vehicle can increase rigidity of the kick-up reinforcing portion as compared to, for example, when the pair of left and right side walls are not provided.

Further, the front wall and the side walls of the kick-up reinforcing portion are joined to the front floor panel, and thus the lower vehicle-body structure of the electric vehicle can stably transfer the collision load from the vehicle rear side to the front floor panel. Thus, the lower vehicle-body structure of the electric vehicle can further prevent deformation of the kick-up portion due to the collision load from the vehicle rear side. Thus, the lower vehicle-body structure of the electric vehicle can stably ensure desired resistance to rear-end collision.

As an aspect of the present disclosure, the lower vehicle-body structure of the electric vehicle may include a long member that is long in the vehicle front-rear direction, and has a front part connected to a vehicle body and a rear part secured to the kick-up reinforcing portion. The long member is, for example, a support member that supports a center console, a support member that supports a shift lever, or a load transfer member that transfers a load in the vehicle front-rear direction.

According to the present disclosure, the lower vehicle-body structure of the electric vehicle can use the kick-up reinforcing portion as a support member that supports the rear part of the long member. Thus, the lower vehicle-body structure of the electric vehicle can eliminate the need to separately provide a support member that supports the rear part of the long member, and ensure support rigidity of the long member that is long in the vehicle front-rear direction.

Further, the front part of the long member is connected to the vehicle body, and thus the lower vehicle-body structure of the electric vehicle can transfer the collision load applied from the vehicle rear side to the kick-up reinforcing portion, via the long member further to a vehicle front side.

Thus, the lower vehicle-body structure of the electric vehicle can increase rigidity of the kick-up portion against the collision load from the vehicle rear side by cooperation between the long member and the kick-up reinforcing portion. Thus, the lower vehicle-body structure of the electric vehicle can more stably ensure desired resistance to rear-end collision.

As an aspect of the present disclosure, the long member may have a substantially gate-shaped vertical section along the vehicle-width direction with a pair of left and right side walls facing each other in the vehicle-width direction, and the side walls of the long member may be secured to the floor cross member and the side walls of the kick-up reinforcing portion.

According to the present disclosure, the lower vehicle-body structure of the electric vehicle can reduce a length of each side wall of the long member in the vehicle up-down direction as compared to when the side wall is secured to the front floor panel. Thus, the lower vehicle-body structure of the electric vehicle can reduce weight of the long member as compared to when the side wall is secured to the front floor panel.

As an aspect of the present disclosure, the battery unit may include a selector switch that is located on the vehicle lower side of the kick-up reinforcing portion and switches between conduction with outside and interruption of the conduction, the front floor panel may include a floor panel opening that opens in an area facing the selector switch of the battery unit, and the kick-up reinforcing portion may include an opening that opens in an area of the upper surface facing the floor panel opening, and a removable cover member covering the opening.

The selector switch is, for example, a switch for temporarily breaking an electric circuit that electrically connects the battery unit and the rotary electric machine to ensure safety of an operator during maintenance of the vehicle. According to the present disclosure, the lower vehicle-body structure of the electric vehicle allows easy access to the selector switch of the battery unit simply by removing the cover member of the kick-up reinforcing portion. Thus, the lower vehicle-body structure of the electric vehicle can ensure desired resistance to rear-end collision, and also increase maintainability of the electric vehicle.

As an aspect of the present disclosure, the kick-up reinforcing portion may include a mounting portion for mounting both the cover member and the long member. According to the present disclosure, the lower vehicle-body structure of the electric vehicle can use the mounting portion both for mounting the cover member and for mounting the long member.

Thus, the lower vehicle-body structure of the electric vehicle can eliminate the need to separately provide, on the kick-up reinforcing portion, a mounting portion for mounting the long member. Also, the lower vehicle-body structure of the electric vehicle can increase rigidity of the kick-up portion against the collision load from the vehicle rear side without increasing the number of components.

The present disclosure can provide the lower vehicle-body structure of the electric vehicle that can ensure desired resistance to rear-end collision even if the tunnel of the front floor panel is eliminated.

DETAILED DESCRIPTION

Now, with reference to the drawings, an embodiment of the present disclosure will be described. A vehicle in this embodiment is, for example, an electric vehicle that includes a battery unit such as a lithium ion secondary battery, and a rotary electric machine rotated by power supplied from the battery unit, and uses output from the rotary electric machine as a drive force. With reference to FIGS. 1 to 13, a lower vehicle-body structure in a vehicle interior part of such an electric vehicle 1 will be described in detail.

Figure 1:
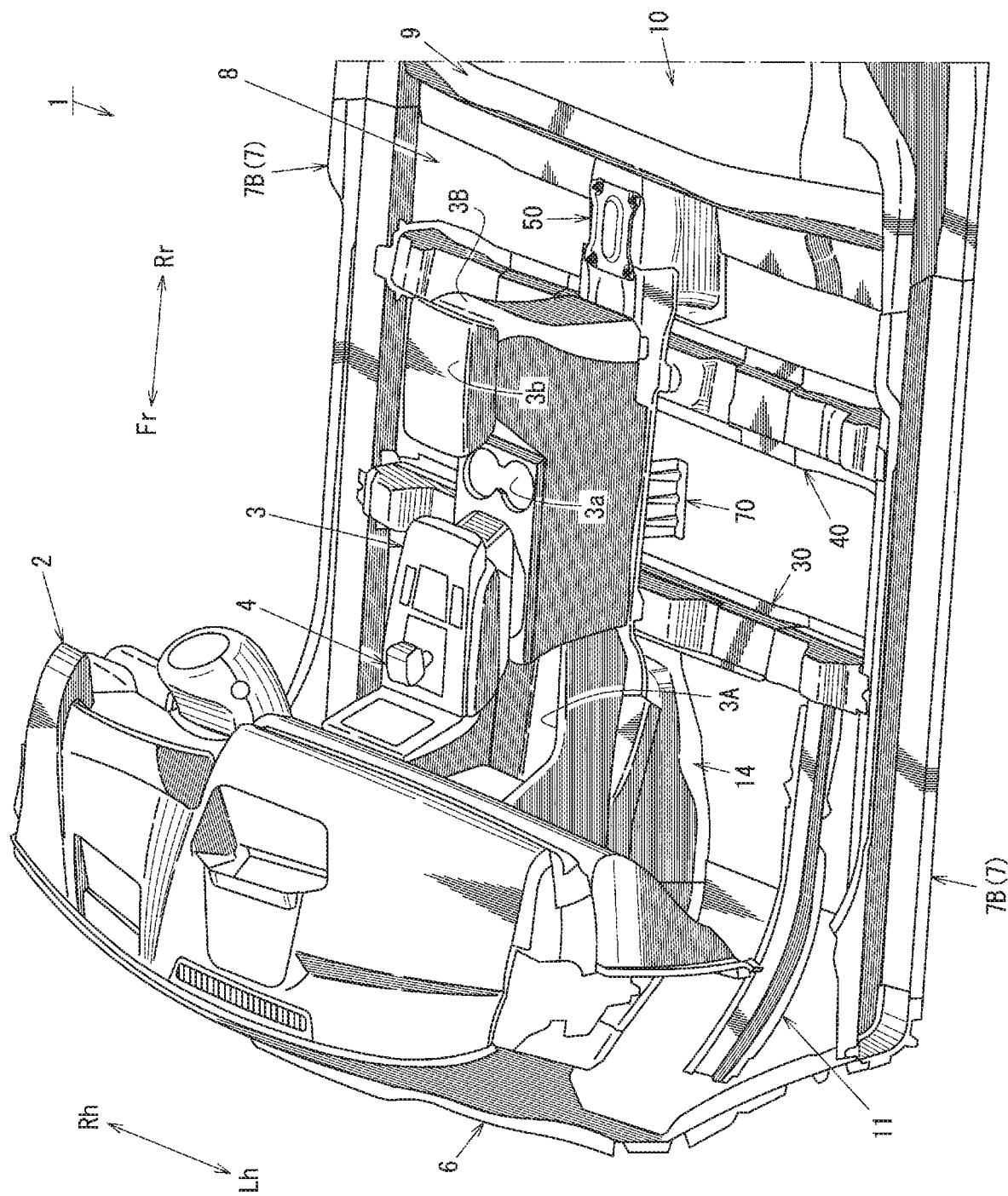
FIG. 1 is a perspective view of an appearance of a vehicle interior part of an electric vehicle.
Figure 2:
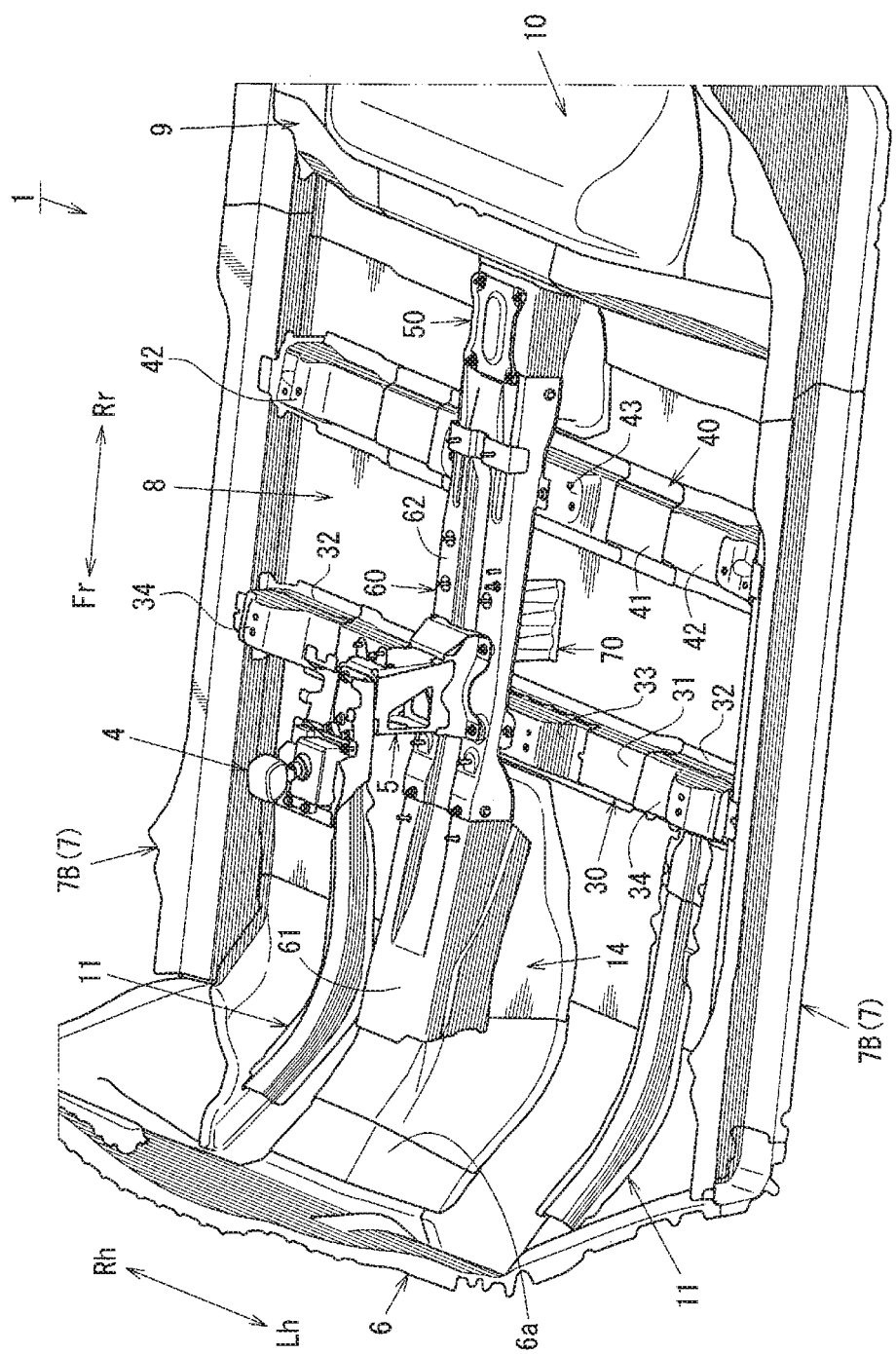
FIG. 2 is a perspective view of an appearance of a lower vehicle body of the electric vehicle.
Figure 3:
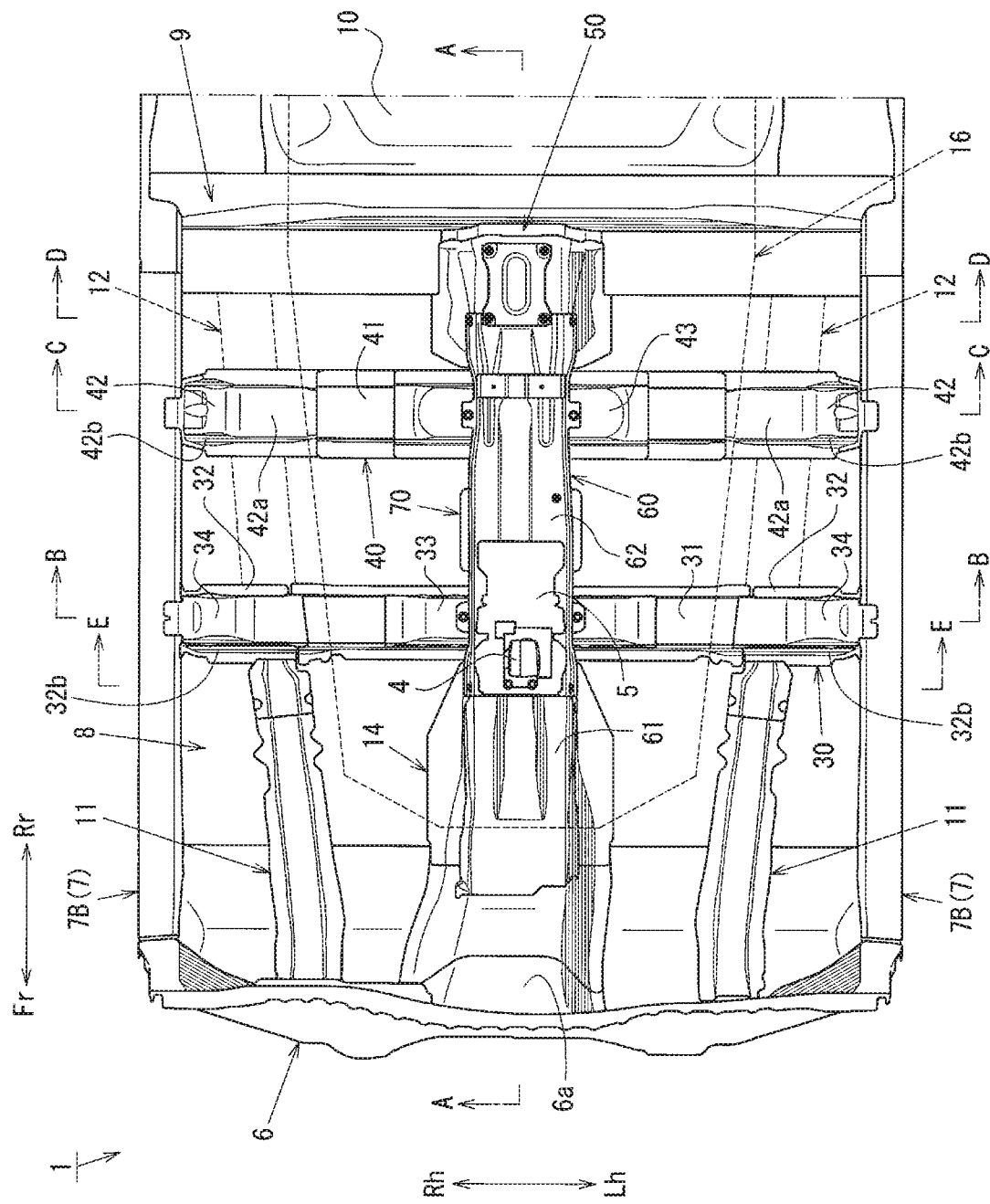
FIG. 3 is a plan view of an appearance of the lower vehicle body.
Figure 4:
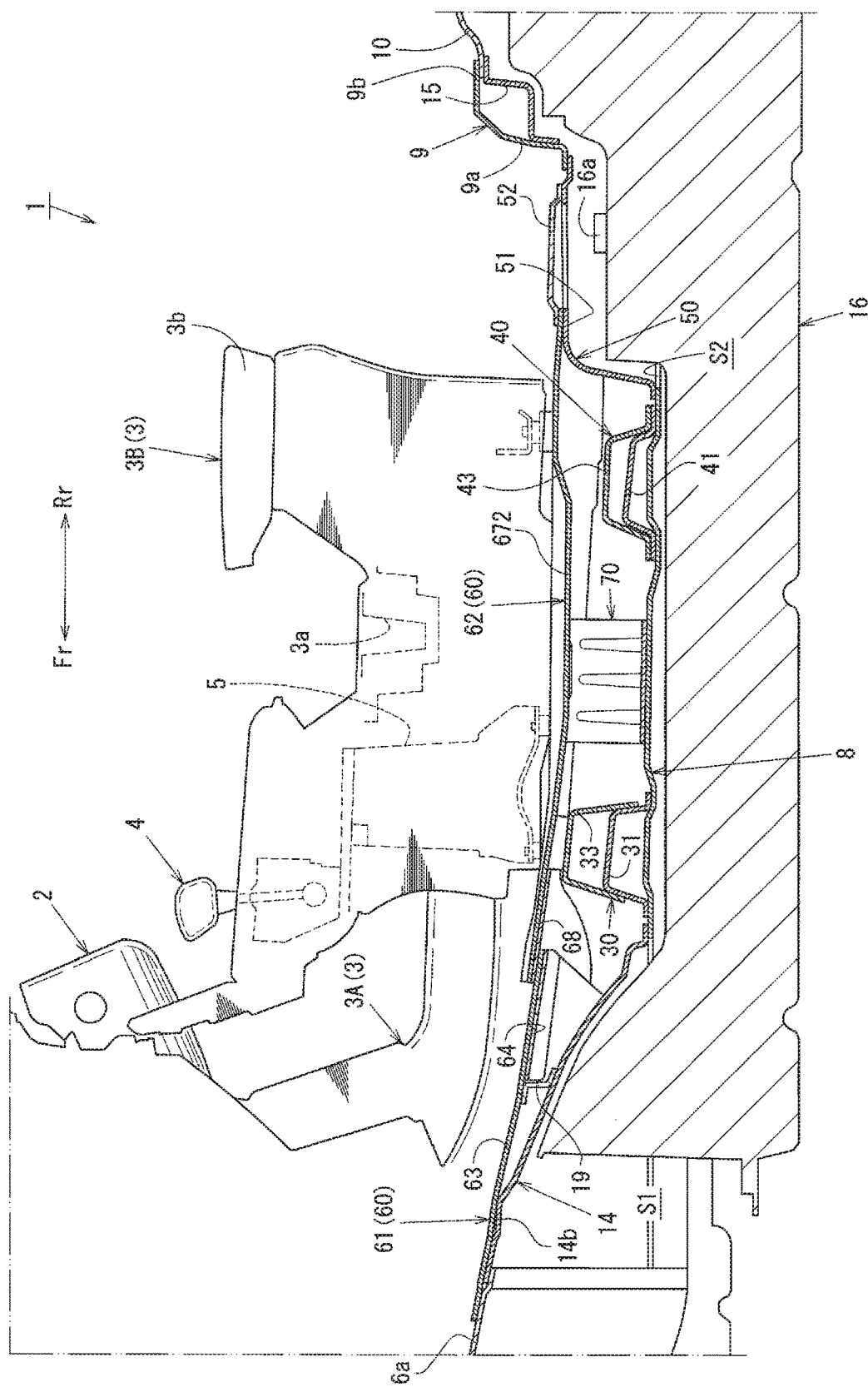
FIG. 4 is a sectional view taken in the direction of arrow A-A in FIG. 3.
Figure 5:
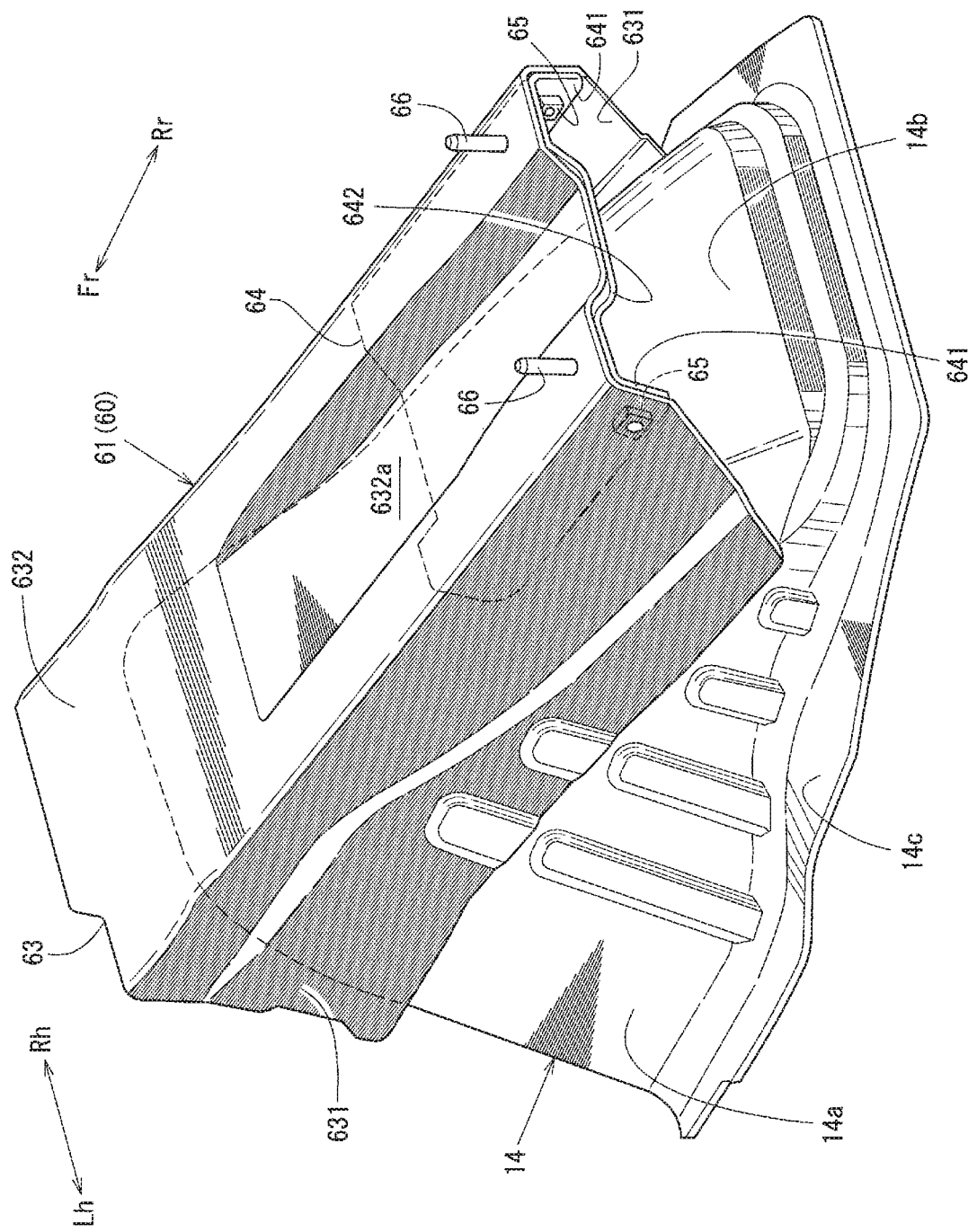
FIG. 5 is a perspective view of an appearance of an expanding member viewed from a vehicle rear side.
Figure 6:
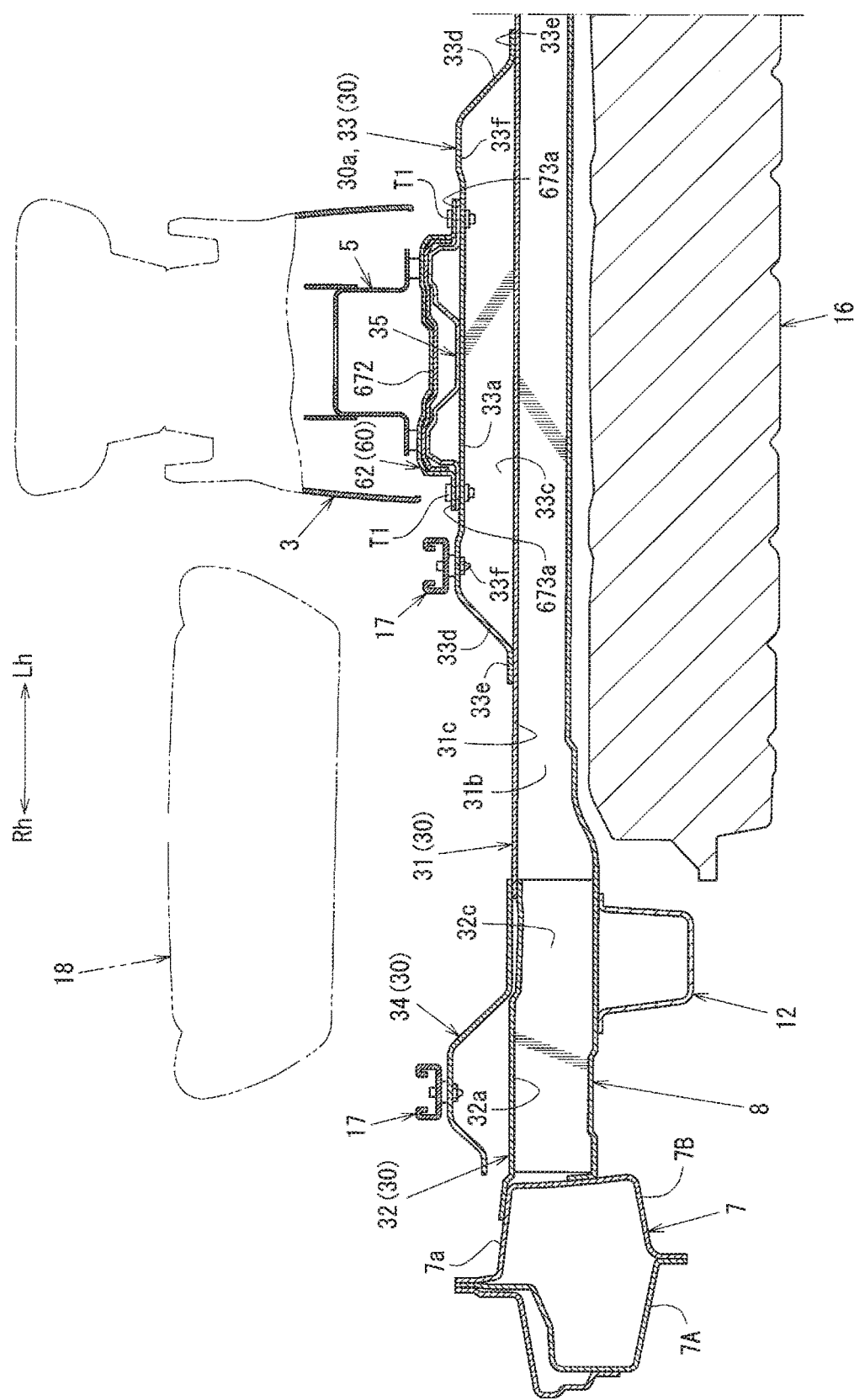
FIG. 6 is a sectional view taken in the direction of arrow B-B in FIG. 3.
Figure 7:
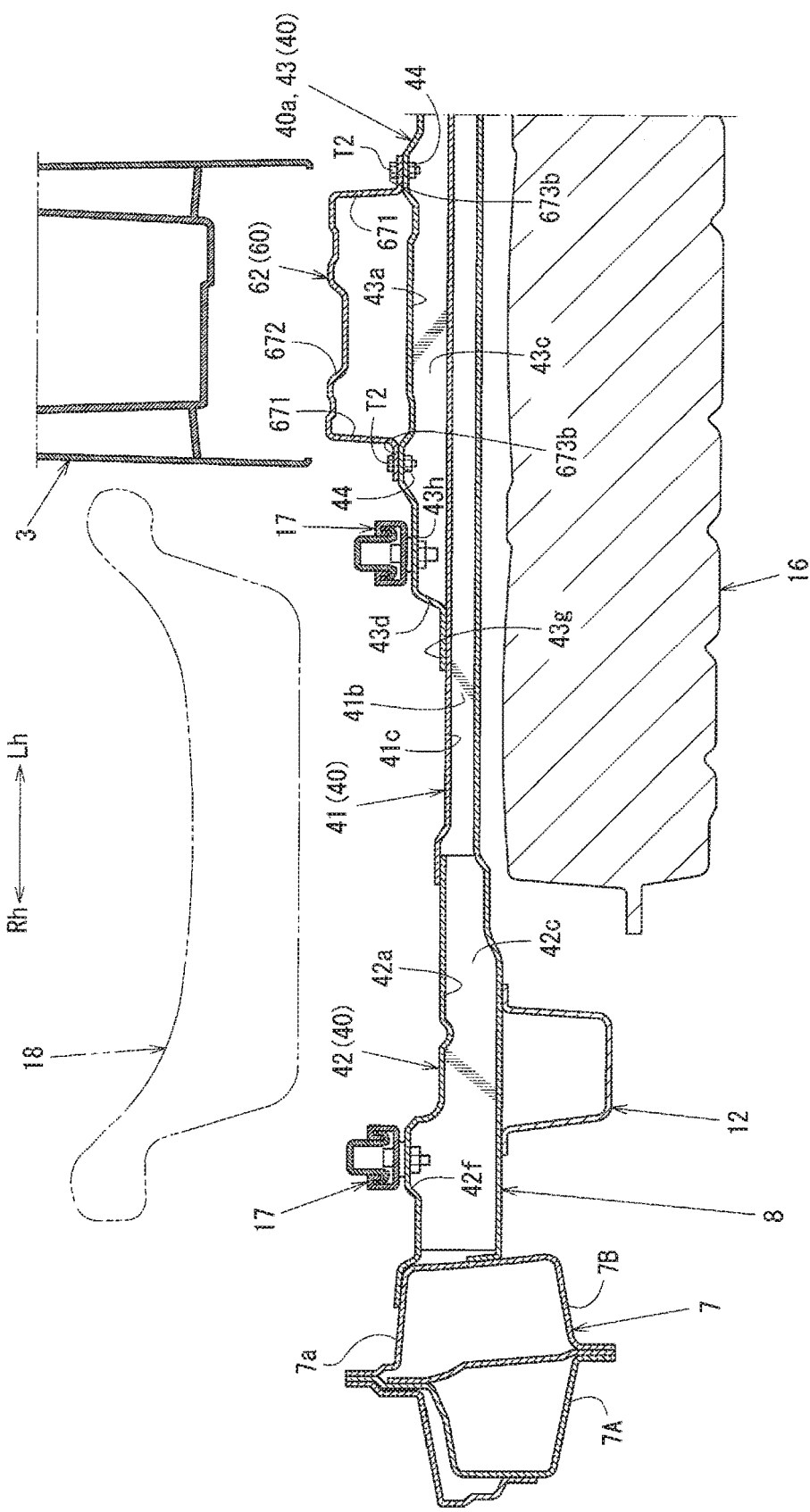
FIG. 7 is a sectional view taken in the direction of arrow C-C in FIG. 3.

FIG. 1 is a perspective view of an appearance of a vehicle interior part of the electric vehicle 1, FIG. 2 is a perspective view of an appearance of a lower vehicle body of the electric vehicle 1, FIG. 3 is a plan view of the lower vehicle body, FIG. 4 is a sectional view taken in the direction of arrow A-A in FIG. 3, FIG. 5 is a perspective view of an appearance of an expanding member 14 viewed from a vehicle rear side, FIG. 6 is a sectional view taken in the direction of arrow B-B in FIG. 3, and FIG. 7 is a sectional view taken in the direction of arrow C-C in FIG. 3.

Figure 8:
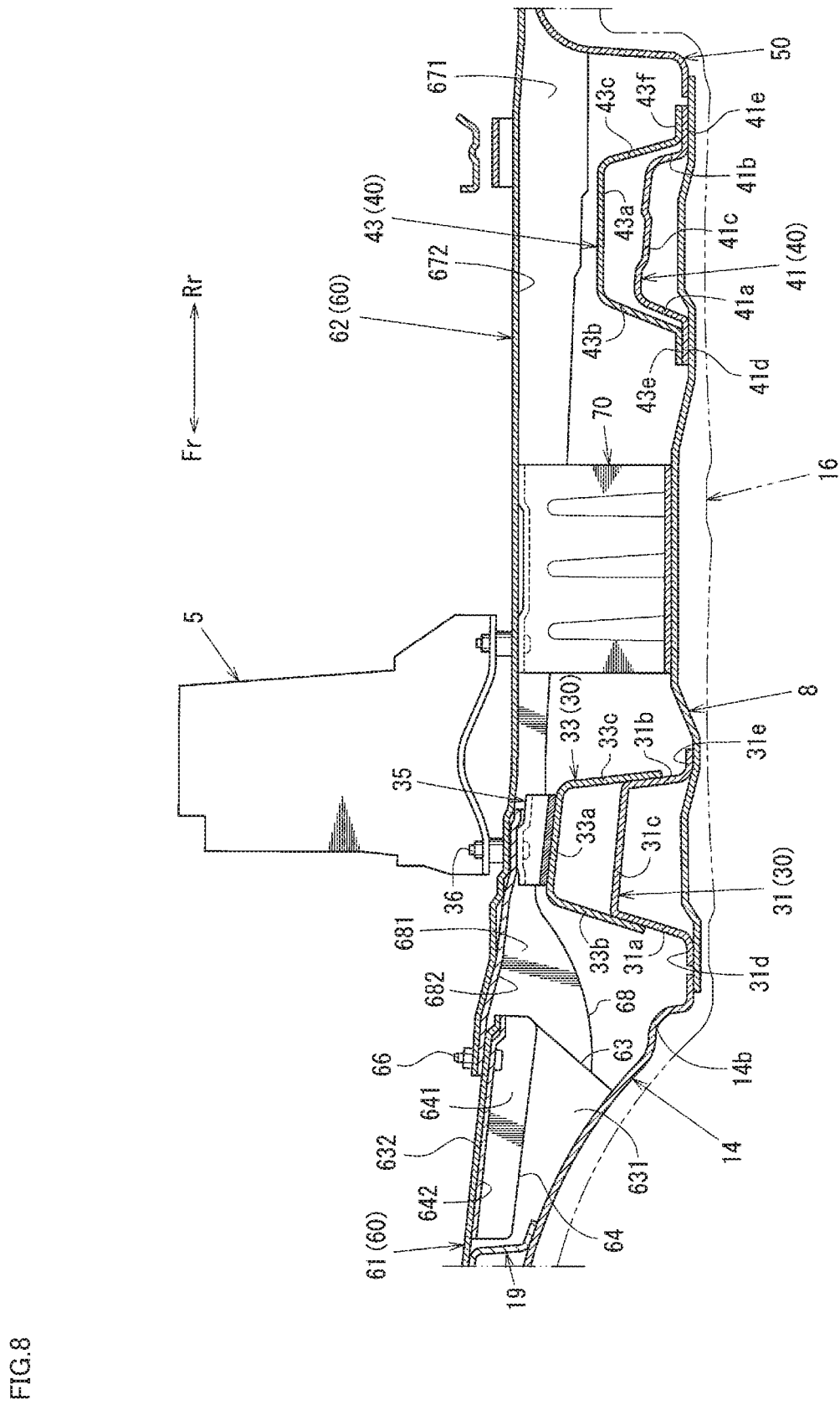
FIG. 8 is an enlarged sectional view of essential portions on a vehicle front side in FIG. 4.
Figure 9:
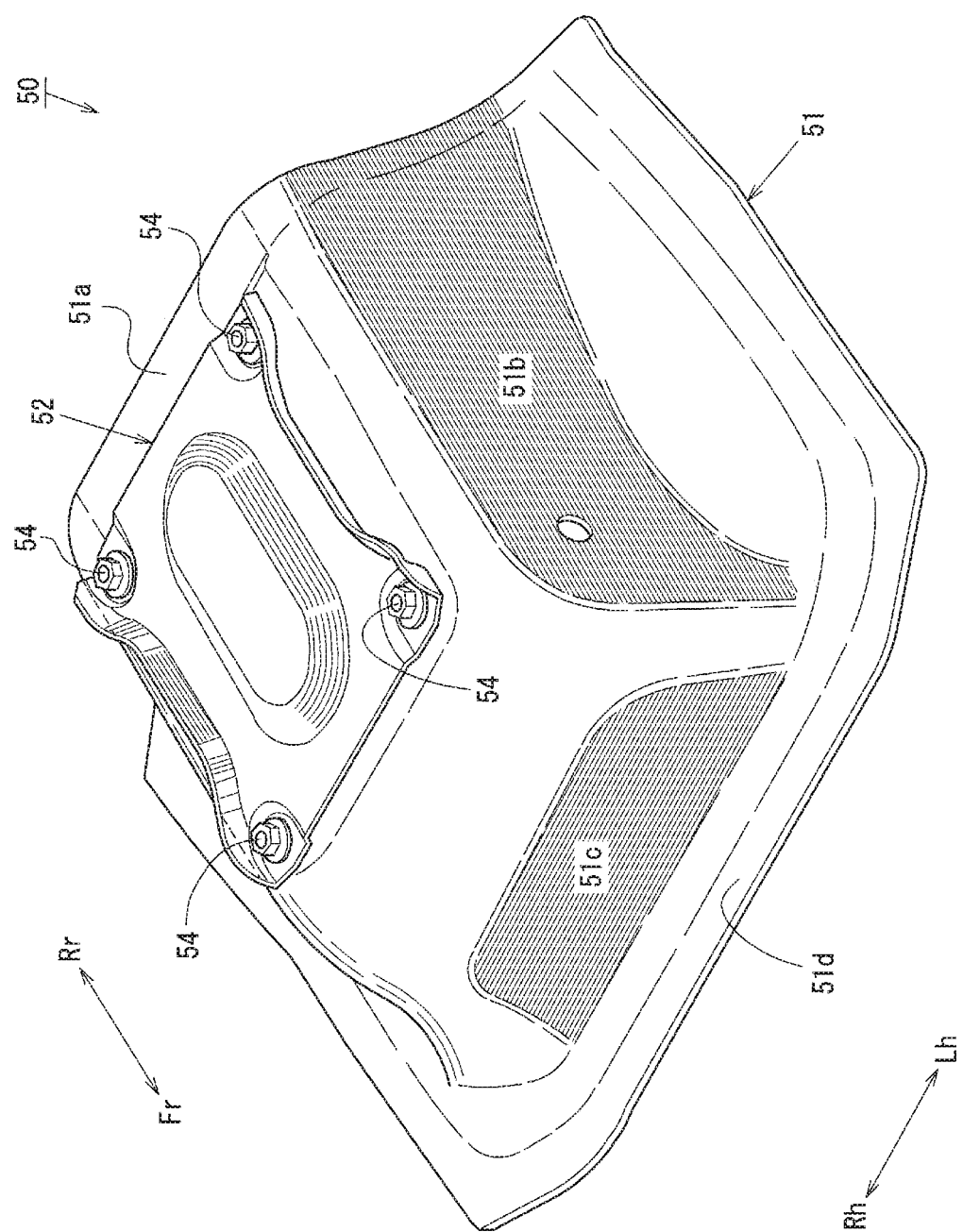
FIG. 9 is a perspective view of an appearance of a kick-up reinforcing element viewed from the vehicle front side.
Figure 10:
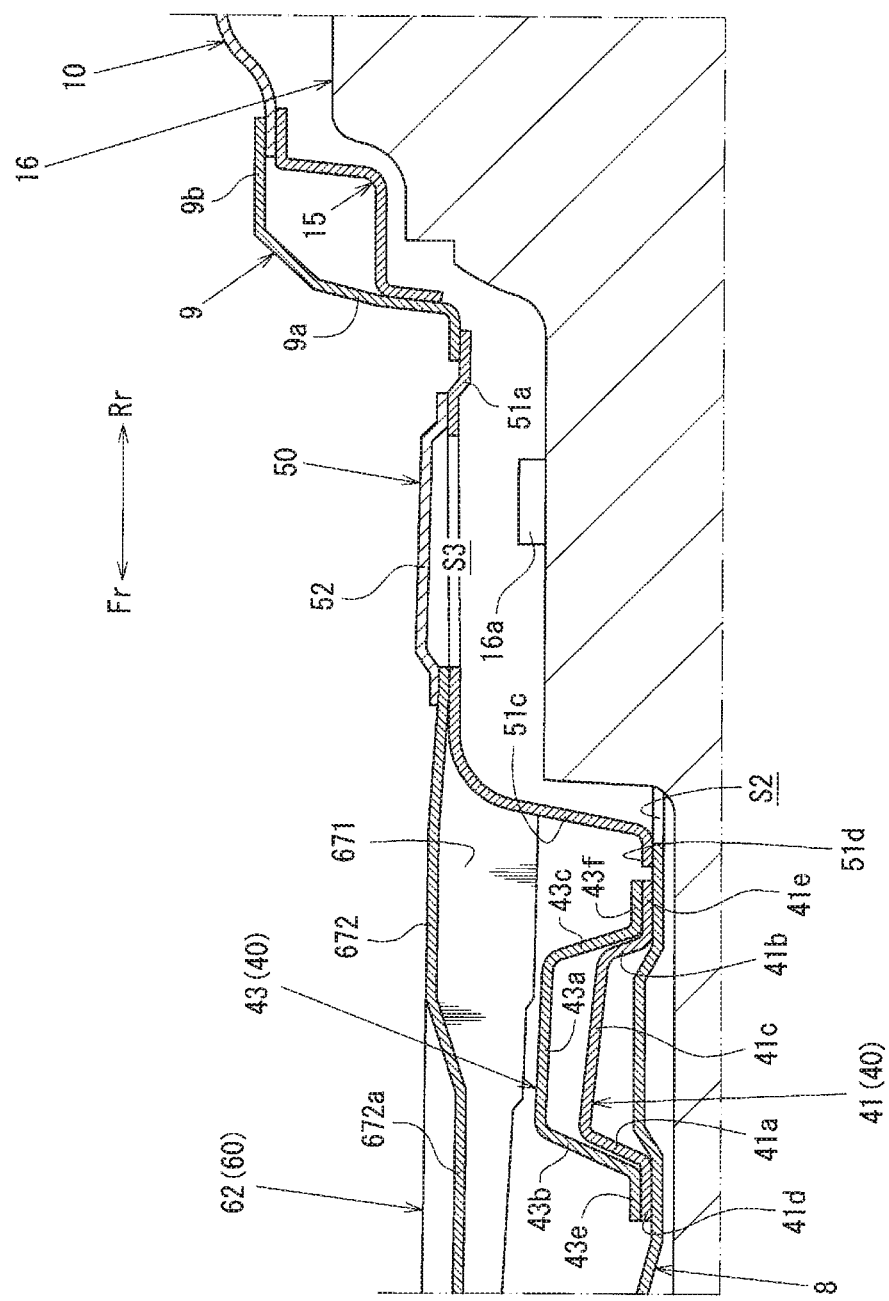
FIG. 10 is an enlarged sectional view of essential portions on a vehicle rear side in FIG. 4.
Figure 11:
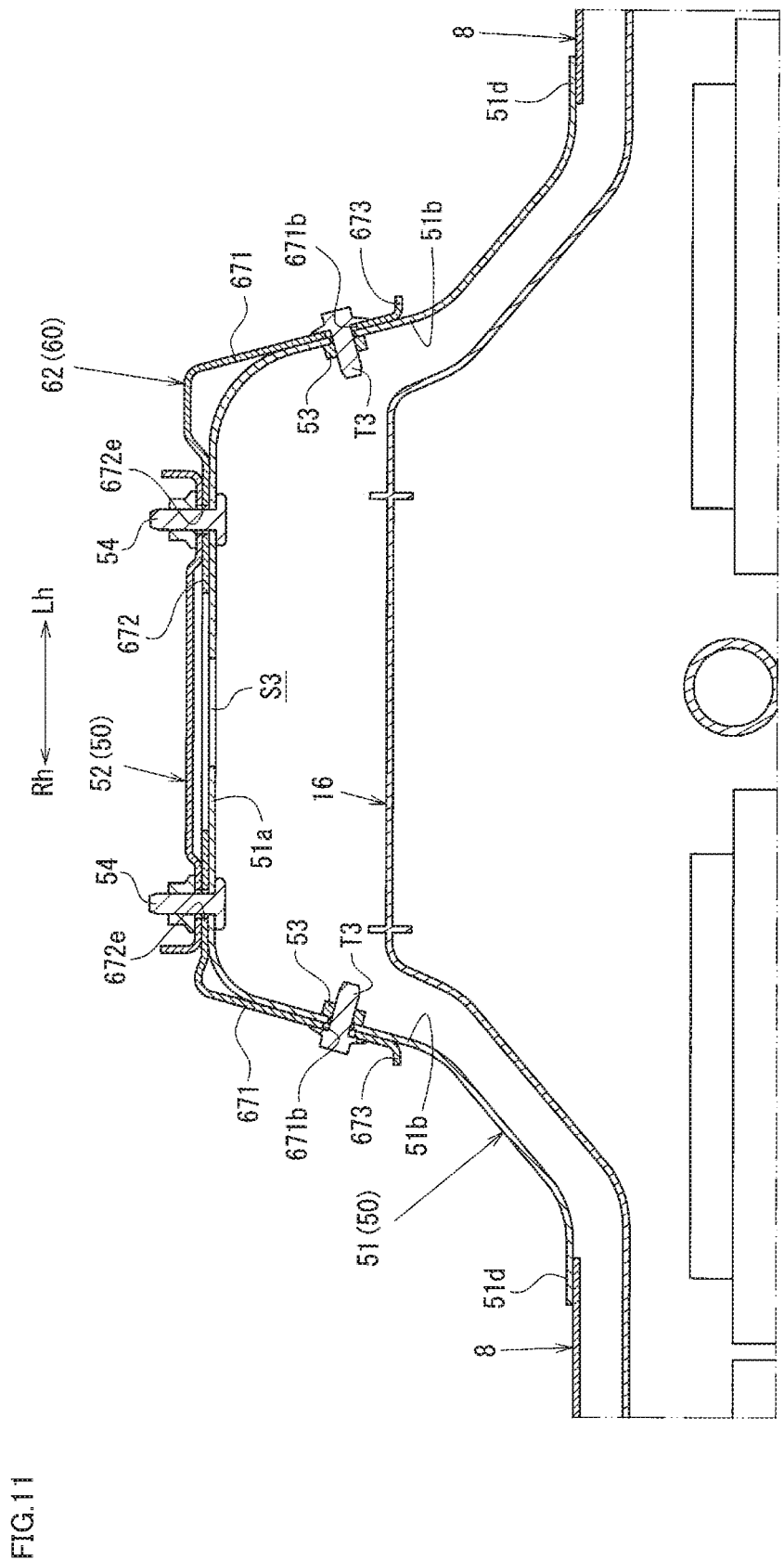
FIG. 11 is a sectional view taken in the direction of arrow D-D in FIG. 3.
Figure 12:
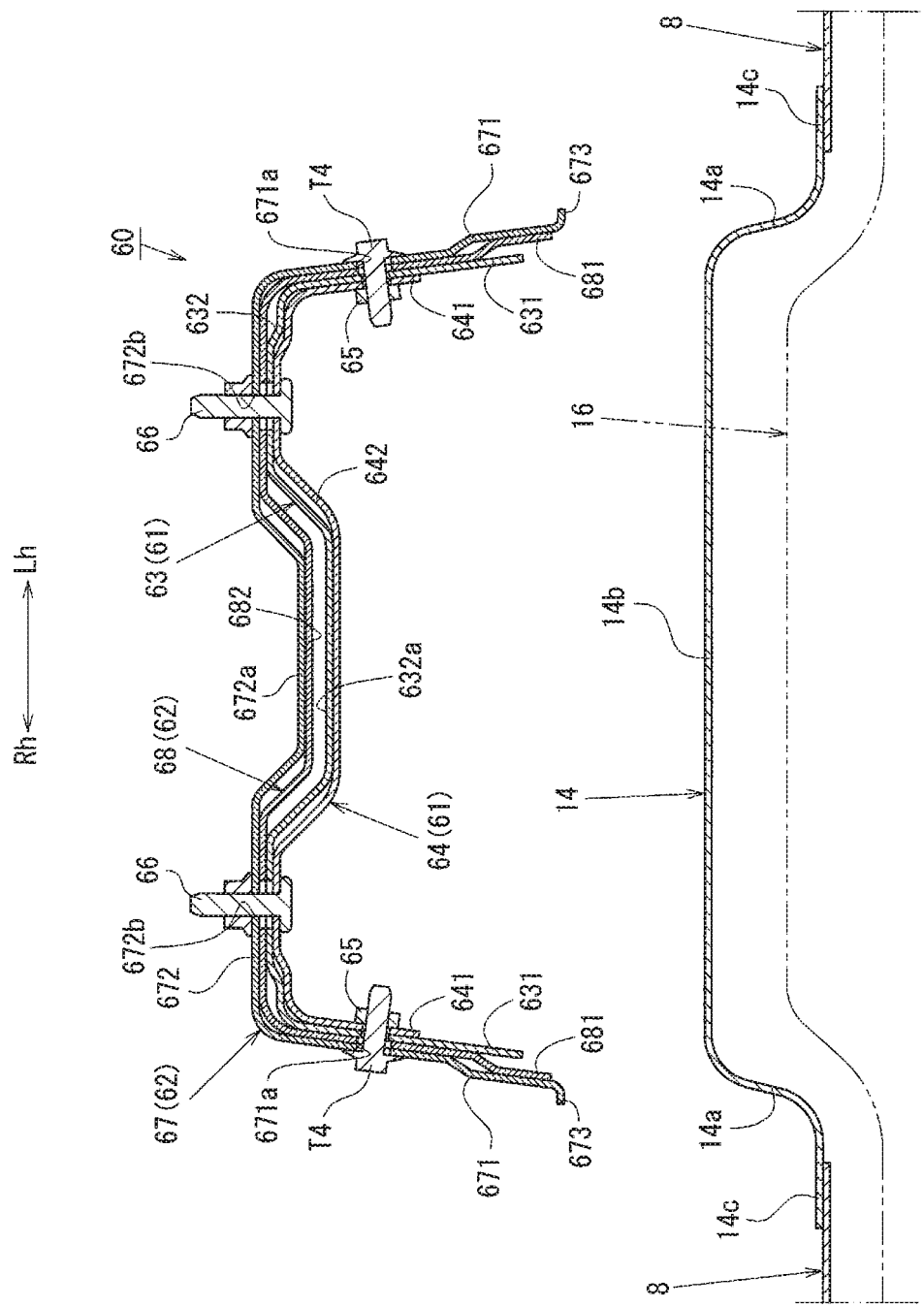
FIG. 12 is a sectional view taken in the direction of arrow E-E in FIG. 3.
Figure 13:
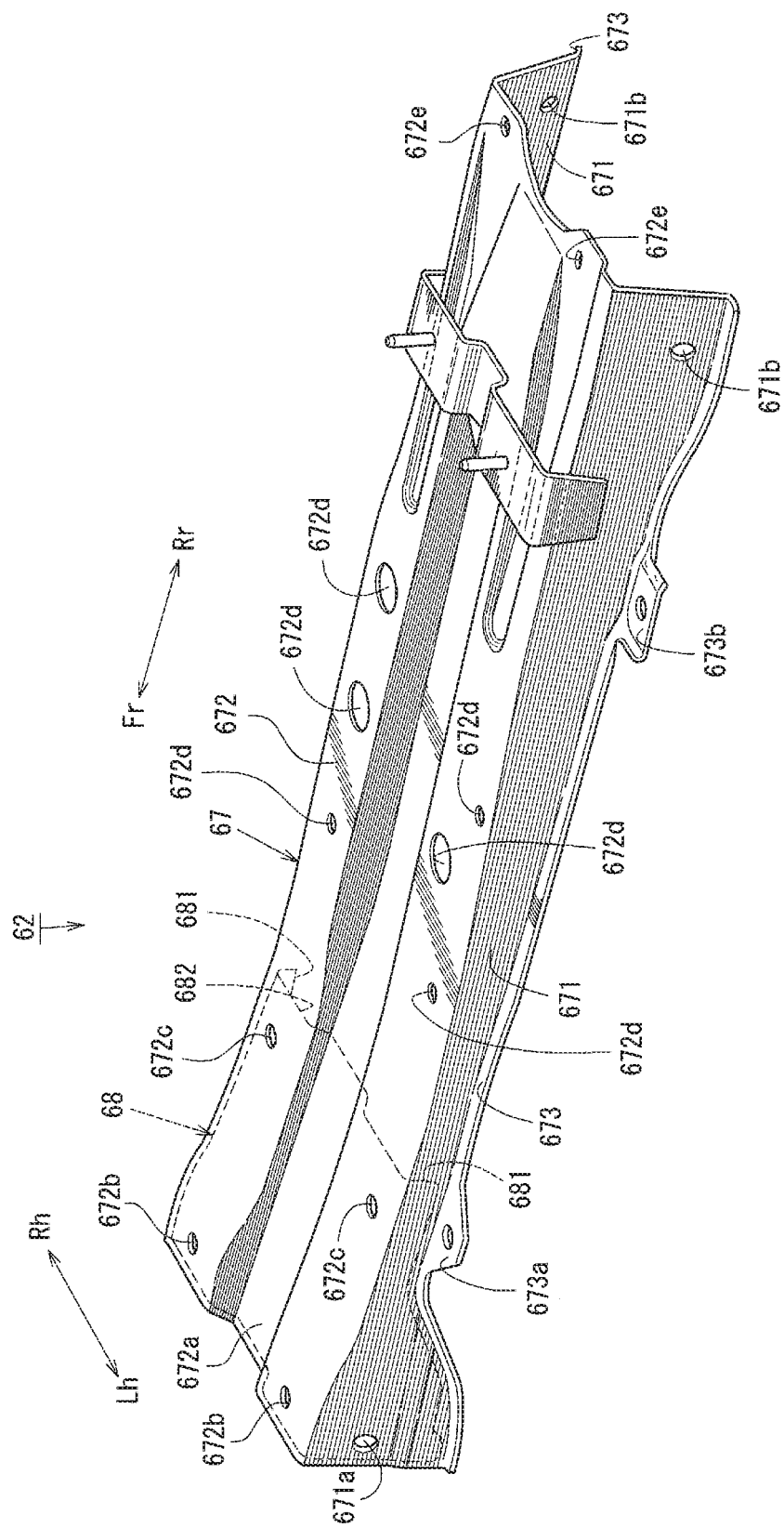
FIG. 13 is perspective view of an appearance of a second support bracket viewed from the vehicle rear side.

Further, FIG. 8 is an enlarged sectional view of essential portions on a vehicle front side in FIG. 4, FIG. 9 is a perspective view of an appearance of a kick-up reinforcing element 50 viewed from the vehicle front side, FIG. 10 is an enlarged sectional view of essential portions on a vehicle rear side in FIG. 4, FIG. 11 is a sectional view taken in the direction of arrow D-D in FIG. 3, FIG. 12 is a sectional view taken in the direction of arrow E-E in FIG. 3, and FIG. 13 is perspective view of an appearance of a second support bracket 62 viewed from the vehicle rear side.

For clear illustration, in FIGS. 1, 2, and 3, a side sill outer portion 7A is not shown, and in FIGS. 4, 6 to 8, and 10, a battery unit 16 disposed on a vehicle lower side of a front floor panel 8 is not shown in detail.

In the drawings, arrows Fr and Rr show a front-rear direction, the arrow Fr shows a front side and the arrow Rr shows a rear side. Further, arrows Rh and Lh show a vehicle-width direction, the arrow Rh shows a right direction and the arrow Lh shows a left direction.

As shown in FIG. 1, in a vehicle interior of the electric vehicle 1, an instrument panel 2 is disposed in a vehicle interior front part, and a center console 3 and a shift lever 4 are disposed on the vehicle lower side substantially at a middle of the instrument panel 2 in the vehicle-width direction. Although not shown in detail, in the vehicle interior of the electric vehicle 1, two front seats are disposed with the center console 3 therebetween, and a rear seat is disposed on the vehicle rear side of the center console 3.

As shown in FIG. 1, the center console 3 include a center console front part 3A on the vehicle lower side of the instrument panel 2, and a center console rear part 3B connected to the vehicle rear side of the center console front part 3A. As shown in FIG. 1, the center console rear part 3B integrally includes a design panel covering a base of the shift lever 4, and on the vehicle rear side of the design panel, a cup holder 3a and an arm rest 3b are disposed in this order.

As shown in FIG. 2, the shift lever 4 is fixedly placed on a console support bracket 60 described later via a shift lever support bracket 5. The shift lever support bracket 5 has a front part fastened to an upper surface of a first floor cross member 30 described later, and a rear part fastened to an upper surface of a standing bracket 70.

As shown in FIGS. 1 and 2, the lower vehicle body in the vehicle interior part of the electric vehicle 1 includes a dash panel 6 that divides a motor room from the vehicle interior in a vehicle front-rear direction, a pair of left and right side sills 7 extending toward the vehicle rear side from lower parts of opposite ends of the dash panel 6 in the vehicle-width direction, a front floor panel 8 that is disposed between the left and right side sills 7 and forms a vehicle interior floor surface, a kick-up portion 9 raised from a rear end of the front floor panel 8 toward a vehicle upper side, and a rear floor panel 10 connected a rear end of the kick-up portion 9.

Further, as shown in FIGS. 1 and 2, the lower vehicle body of the electric vehicle 1 includes a pair of left and right floor frame upper portions 11 extending across the dash panel 6 and the front floor panel 8 in the vehicle front-rear direction, a pair of left and right floor frame lower portions 12 (see FIG. 3) extending from a rear end of the floor frame upper portion 11 toward the vehicle rear side, and a first floor cross member 30 and a second floor cross member 40 connecting the left and right side sills 7 in the vehicle-width direction.

In addition, as shown in FIGS. 1 and 2, the lower vehicle body of the electric vehicle 1 includes a kick-up reinforcing element 50 that connects a portion near the rear end of the front floor panel 8 and the kick-up portion 9, the console support bracket 60 that supports the shift lever 4 and the center console 3, and the standing bracket 70 that supports the console support bracket 60 from the vehicle lower side.

Specifically, the dash panel 6 is a panel member having a thickness in the vehicle front-rear direction, and has a lower part curved toward the vehicle rear side. As shown in FIGS. 2 to 4, the dash panel 6 has, substantially at the middle in the vehicle-width direction, a tunnel-shaped portion 6a expanding like a tunnel extending from a vehicle front upper side toward a vehicle rear lower side. The tunnel-shaped portion 6a is formed of a separate member covering an opening that is cut substantially at the middle of the dash panel 6 in the vehicle-width direction, and joined to the dash panel 6 and thus integrated with the dash panel 6.

The left and right side sills 7 each form a substantially rectangular closed vertical section along the vehicle-width direction (see FIG. 6). More specifically, the side sill 7 includes a side sill outer portion 7A (see FIG. 6) having a substantially hat-shaped vertical section along the vehicle-width direction that protrudes toward a vehicle-width-direction outer side, and a side sill inner portion 7B (see FIG. 6) having a substantially hat-shaped vertical section along the vehicle-width direction that protrudes toward a vehicle-width-direction inner side.

As shown in FIGS. 2 to 4, the front floor panel 8 is a substantially flat panel member having a thickness in a vehicle up-down direction, and has a front end joined to a lower end of the dash panel 6 and a rear end joined to a lower end of the kick-up portion 9 described later.

As shown in FIG. 4, in a front part of the front floor panel 8, a front opening S1 is formed that is cut continuously with an internal space of the tunnel-shaped portion 6a of the dash panel 6 substantially at the middle in the vehicle-width direction. On the other hand, as shown in FIG. 4, in a rear part of the front floor panel 8, a rear opening S2 is formed that is cut continuously with an internal space of the kick-up reinforcing element 50 described later substantially at the middle in the vehicle-width direction.

As shown in FIGS. 2 to 4, to the front floor panel 8, an expanding member 14 is joined that covers the front opening S1 and expands toward the vehicle upper side continuously with the tunnel-shaped portion 6a of the dash panel 6. The expanding member 14 has a length in the vehicle front-rear direction from a front end of the front floor panel 8 to a front end of the first floor cross member 30 described later.

More specifically, as shown in FIGS. 4 and 5, the expanding member 14 includes a pair of left and right side walls 14a facing each other in the vehicle-width direction to form a substantially triangular shape in side view, a rear wall 14b inclined so that a rear end is located on the vehicle lower side with respect to a front end, and a flange 14c along lower ends of the side walls 14a and a lower end of the rear wall 14b, and has a substantially box shape opening on the vehicle front side and the vehicle lower side.

The expanding member 14 forms a substantially tunnel-shaped space continuous with the tunnel-shaped portion 6a of the dash panel 6 by front parts of the side walls 14a and a front part of the rear wall 14b being joined to the tunnel-shaped portion 6a of the dash panel 6 and the flange 14c being joined to an upper surface of the front floor panel 8.

As shown in FIGS. 2 to 4, the kick-up portion 9 includes a kick-up front surface 9a extending from the rear end of the front floor panel 8 toward the vehicle upper side, and a kick-up upper surface 9b extending from an upper end of the kick-up front surface 9a toward the vehicle rear side, and has a substantially L-shaped vertical section along the vehicle front-rear direction.

As shown in FIG. 4, to a lower surface of the kick-up portion 9, a third cross member 15 extending in the vehicle-width direction is joined across an upper part of the kick-up front surface 9a and a front part of the kick-up upper surface 9b. The third cross member 15 has a substantially L-shaped vertical section along the vehicle front-rear direction with a corner on the vehicle rear lower side, and forms, together with the kick-up portion 9, a substantially rectangular closed section extending in the vehicle-width direction.

The rear floor panel 10 is a panel member having a thickness in the vehicle up-down direction, and joined to a rear end of the kick-up upper surface 9b of the kick-up portion 9. Although not shown in detail, a rear seat surface is fixedly placed on an upper surface of the rear floor panel 10.

As shown in FIGS. 2 and 3, each floor frame upper portion 11 is disposed across a vehicle interior inner side of a lower part of the dash panel 6 and an upper surface of the front floor panel 8. Although not shown in detail, the floor frame upper portion 11 has a substantially hat-shaped vertical section along the vehicle-width direction protruding toward the vehicle upper side, and is joined to the dash panel 6 and the front floor panel 8 to form a substantially rectangular closed section extending in the vehicle front-rear direction.

As shown in FIG. 3, the floor frame upper portion 11 is disposed near the vehicle-width-direction outer side to extend near the side sill 7 in plan view, and has a rear end located on the vehicle-width-direction outer side with respect to a front end.

As shown in FIG. 3, each floor frame lower portion 12 is disposed on a lower surface of the front floor panel 8 continuously with the floor frame upper portion 11 in plan view. More specifically, as shown in FIG. 3, the floor frame lower portion 12 has a rear end located on the vehicle-width-direction outer side with respect to a front end. In other words, the floor frame lower portions 12 are disposed to extend near the left and right side sills 7.

As shown in FIG. 6, the floor frame lower portion 12 has a substantially hat-shaped vertical section along the vehicle-width direction protruding toward the vehicle lower side, and is joined to the lower surface of the front floor panel 8 to form a substantially rectangular closed section extending in the vehicle front-rear direction.

As shown in FIGS. 3 and 4, between the floor frame lower portions 12 on the vehicle lower side of the front floor panel 8, a battery unit 16 that supplies power to the rotary electric machine is disposed in an area from a portion near the front end of the front floor panel 8 to the rear floor panel 10.

Although not shown in detail, the battery unit 16 includes a plurality of high-voltage battery bodies electrically connected, a harness that electrically connects the rotary electric machine and the plurality of battery bodies, a selector switch 16a that switches between conduction between the rotary electric machine and the battery bodies and interruption of the conduction, and the like. As shown in FIG. 4, the selector switch 16a is disposed on the vehicle lower side of the rear opening S2 in the front floor panel 8.

As shown in FIGS. 2 and 3, the first floor cross member 30 substantially linearly connects the left and right side sills 7 in a position adjacent, on the vehicle rear side, to the rear end of the expanding member 14 on the front floor panel 8. As shown in FIG. 4, the first floor cross member 30 forms, together with the front floor panel 8, a closed vertical section along the vehicle front-rear direction that extends in the vehicle-width direction.

Further, as shown in FIG. 6, the first floor cross member 30 has, in a vertical section along the vehicle-width direction, an upper enlarged section 30a with a section enlarged toward the vehicle upper side substantially at the middle in the vehicle-width direction so that an upper surface of the first floor cross member 30 substantially at the middle in the vehicle-width direction is located on the vehicle upper side with respect to the upper surface on the vehicle-width-direction outer side.

As shown in FIGS. 2 and 3, the second floor cross member 40 substantially linearly connects the left and right side sills 7 at a predetermined distance from the first floor cross member 30 on the vehicle rear side. As shown in FIG. 4, the second floor cross member 40 forms, together with the front floor panel 8, a closed vertical section along the vehicle front-rear direction that extends in the vehicle-width direction.

Further, as shown in FIG. 7, the second floor cross member 40 has, in a vertical section along the vehicle-width direction, an upper enlarged section 40a with a section enlarged toward the vehicle upper side substantially at the middle in the vehicle-width direction so that an upper surface of the second floor cross member 40 substantially at the middle in the vehicle-width direction is located on the vehicle upper side with respect to the upper surface on the vehicle-width-direction outer side.

As shown in FIGS. 2 to 4, the kick-up reinforcing element 50 covers the rear opening S2 in the front floor panel 8 and connects the kick-up front surface 9a of the kick-up portion 9 and the front floor panel 8 substantially at the middle in the vehicle-width direction.

As shown in FIGS. 2 to 4, the console support bracket 60 connects the expanding member 14 of the front floor panel 8 and the kick-up reinforcing element 50 in the vehicle front-rear direction. Further, the console support bracket 60 is fastened to the upper surface of the first floor cross member 30, the upper surface of the second floor cross member 40, and an upper surface of the standing bracket 70.

As shown in FIGS. 1, 2, and 4, on the console support bracket 60, the shift lever support bracket 5 that supports the shift lever 4 and the center console rear part 3B are fixedly placed. As shown in FIGS. 2 and 4, the standing bracket 70 connects and supports the upper surface of the front floor panel 8 and an upper surface of the console support bracket 60 between the first floor cross member 30 and the second floor cross member 40.

The first floor cross member 30, the second floor cross member 40, the kick-up reinforcing element 50, and the console support bracket 60 will be further described in more detail. As shown in FIGS. 3 and 6, the first floor cross member 30 includes a middle member 31 extending in the vehicle-width direction between the floor frame lower portions 12, a pair of left and right end members 32 joined to opposite ends of the middle member 31 in the vehicle-width direction, a cross member reinforcing element 33 that forms the upper enlarged section 30a, and a pair of left and right front seat outer securing members 34 on which front parts of seat slide rails 17 on the vehicle-width-direction outer side are fixedly placed. The seat slide rails 17 are a pair of left and right seat slide rails 17 that support a front seat 18.

As shown in FIG. 8, the middle member 31 has a substantially hat-shaped vertical section along the vehicle front-rear direction that protrudes toward the vehicle upper side. Specifically, as shown in FIGS. 6 and 8, the middle member 31 integrally includes a member front surface 31a as a surface on the vehicle front side, a member rear surface 31b as a surface on the vehicle rear side, a member upper surface 31c as a surface on the vehicle upper side, a front flange 31d extending from a lower end of the member front surface 31a toward the vehicle front side, and a rear flange 31e extending from a lower end of the member rear surface 31b toward the vehicle rear side.

As shown in FIGS. 6 and 8, the front flange 31d and the rear flange 31e of the middle member 31 are joined to the upper surface of the front floor panel 8. As shown in FIGS. 3 and 6, the member upper surface 31c of the middle member 31 has a substantially rectangular flat shape in plan view, and is formed substantially in the same position in the vehicle up-down direction as an inner portion upper surface 7a of the side sill inner portion 7B.

On the other hand, the left and right end members 32 each have a substantially hat-shaped vertical section along the vehicle front-rear direction that protrudes toward the vehicle upper side, and continuously extend from the middle member 31 in the vehicle-width direction.

Specifically, as shown in FIGS. 3 and 6, the end member 32 integrally includes a member upper surface 32a located substantially in the same position in the vehicle up-down direction as the member upper surface 31c of the middle member 31, a member front surface 32b (see FIG. 3) extending from a front end of the member upper surface 32a toward the vehicle lower side, a member rear surface 32c extending from a rear end of the member upper surface 32a toward the vehicle lower side, a front flange extending from a lower end of the member front surface 32b toward the vehicle front side, and a rear flange extending from a lower end of the member rear surface 32c toward the vehicle rear side.

The front flange and the rear flange of the end member 32 are joined to the upper surface of the front floor panel 8, and an extending portion from the member upper surface 32a on the vehicle-width-direction outer side is joined to the inner portion upper surface 7a of the side sill 7.

As shown in FIG. 8, the cross member reinforcing element 33 has a substantially gate-shaped vertical section along the vehicle front-rear direction that opens on the vehicle lower side, and forms, together with the middle member 31, a closed section extending in the vehicle-width direction.

Specifically, as shown in FIGS. 6 and 8, the cross member reinforcing element 33 integrally includes an upper surface 33a located on the vehicle upper side with respect to the member upper surface 31c of the middle member 31, a front surface 33b extending from a front end of the upper surface 33a toward the vehicle lower side, a rear surface 33c extending from a rear end of the upper surface 33a toward the vehicle lower side, and a pair of left and right side surfaces 33d extending from opposite ends of the upper surface 33a in the vehicle-width direction toward the vehicle lower side.

Further, as shown in FIG. 6, the cross member reinforcing element 33 integrally includes a pair of left and right side flanges 33e extending from lower ends of the side surfaces 33d toward the vehicle-width-direction outer side, and has a hat-shaped vertical section along the vehicle-width direction and forms a closed section together with the member upper surface 31c of the middle member 31.

As shown in FIGS. 6 and 8, in the cross member reinforcing element 33, the front surface 33b is joined to the member front surface 31a of the middle member 31, the rear surface 33c is joined to the member rear surface 31b of the middle member 31, and the side flanges 33e are joined to the member upper surface 31c of the middle member 31.

As shown in FIG. 6, front seat inner securing portions 33f to which front parts of seat slide rails 17 on the vehicle-width-direction inner side are fastened are integrally formed with opposite ends of the upper surface 33a of the cross member reinforcing element 33 in the vehicle-width direction. The front seat inner securing portions 33f are formed substantially in the same position in the vehicle up-down direction as the middle of the upper surface 33a in the vehicle-width direction.

In addition, as shown in FIGS. 6 and 8, a fastening bracket 35 having a substantially M-shaped vertical section along the vehicle-width direction is fastened by fastening bolts T1 to the upper surface 33a on the vehicle-width-direction inner side with respect to the front seat inner securing portions 33f.

As shown in FIG. 8, two weld bolts 36 are joined to an upper surface of the fastening bracket 35 so as to protrude toward the vehicle upper side. As shown in FIG. 8, the weld bolts 36 co-fasten the shift lever support bracket 5 and the console support bracket 60 (a bracket upper surface 672 of a second support bracket 62 described later). As shown in FIGS. 2 and 6, the front seat outer securing member 34 has a substantially box shape expanding toward the vehicle upper side with respect to the member upper surface 32a of the end member 32.

As shown in FIGS. 3 and 7, the second floor cross member 40 includes a middle member 41 extending in the vehicle-width direction between the floor frame lower portions 12, a pair of left and right end members 42 joined to opposite ends of the middle member 41 in the vehicle-width direction, and a cross member reinforcing element 43 that forms the upper enlarged section 40a.

As shown in FIG. 8, the middle member 41 has a substantially hat-shaped vertical section along the vehicle front-rear direction that protrudes toward the vehicle upper side. Specifically, as shown in FIGS. 7 and 8, the middle member 41 integrally includes a member front surface 41a as a surface on the vehicle front side, a member rear surface 41b as a surface on the vehicle rear side, a member upper surface 41c as a surface on the vehicle upper side, a front flange 41d extending from a lower end of the member front surface 41a toward the vehicle front side, and a rear flange 41e extending from a lower end of the member rear surface 41b toward the vehicle rear side.

As shown in FIGS. 7 and 8, the front flange 41d and the rear flange 41e of the middle member 41 are joined to the upper surface of the front floor panel 8. On the other hand, the left and right end members 42 each have a substantially hat-shaped vertical section along the vehicle front-rear direction that protrudes toward the vehicle upper side, and continuously extend from the middle member 41 in the vehicle-width direction.

Specifically, as shown in FIGS. 3 and 7, the end member 42 integrally includes a member upper surface 42a located substantially in the same position in the vehicle up-down direction as the member upper surface 41c of the middle member 41, a member front surface 42b (see FIG. 3) extending from a front end of the member upper surface 42a toward the vehicle lower side, a member rear surface 42c extending from a rear end of the member upper surface 42a toward the vehicle lower side, a front flange extending from a lower end of the member front surface 42b toward the vehicle front side, and a rear flange extending from a lower end of the member rear surface 42c toward the vehicle rear side.

The front flange and the rear flange of the end member 42 are joined to the upper surface of the front floor panel 8, and an extending portion from the member upper surface 42a (a front seat outer securing portion 42f described later) on the vehicle-width-direction outer side is joined to the inner portion upper surface 7a of the side sill 7.

As shown in FIGS. 3 and 7, the front seat outer securing portion 42f to which the seat slide rail 17 on the vehicle-width-direction outer side is fastened is integrally formed with the vehicle-width-direction outer side of the member upper surface 42a of the end member 42 so as to expand toward the vehicle upper side.

As shown in FIGS. 7 and 8, the cross member reinforcing element 43 has a substantially hat-shaped vertical section along the vehicle front-rear direction that protrudes toward the vehicle upper side, and forms, together with the middle member 41, a closed section that extends in the vehicle-width direction.

Specifically, as shown in FIGS. 7 and 8, the cross member reinforcing element 43 integrally includes an upper surface 43a located on the vehicle upper side with respect to the member upper surface 41c of the middle member 41, a front surface 43b extending from a front end of the upper surface 43a toward the vehicle lower side, a rear surface 43c extending from a rear end of the upper surface 43a toward the vehicle lower side, a pair of left and right side surfaces 43d extending from opposite ends of the upper surface 43a in the vehicle-width direction toward the vehicle lower side, a front flange 43e extending from a lower end of the front surface 43b toward the vehicle front side, and a rear flange 43f extending from a lower end of the rear surface 43c toward the vehicle rear side.

Further, as shown in FIG. 7, the cross member reinforcing element 43 integrally includes a pair of left and right side flanges 43g extending from lower ends of the side surfaces 43d toward the vehicle-width-direction outer side so as to have a hat-shaped vertical section along the vehicle-width direction and form a closed section together with the member upper surface 41c of the middle member 41.

As shown in FIGS. 7 and 8, in the cross member reinforcing element 43, the front flange 43e is joined via the front flange 41d of the middle member 41 to the upper surface of the front floor panel 8, the rear flange 43f is joined via the rear flange 41e of the middle member 41 to the upper surface of the front floor panel 8, and the side flange 43g is joined to the member upper surface 41c of the middle member 41.

As shown in FIG. 7, front seat inner securing portions 43h to which rear parts of the seat slide rails 17 on the vehicle-width-direction inner side are fastened are integrally formed with opposite ends of the upper surface 43a of the cross member reinforcing element 43 in the vehicle-width direction in substantially the same position in the vehicle up-down direction as the middle of the upper surface 43a in the vehicle-width direction.

In addition, as shown in FIG. 7, two weld nuts 44 into which fastening bolts T2 are threaded are joined to a lower side of the upper surface 43a at a predetermined interval in the vehicle-width direction on the vehicle-width-direction inner side with respect to the front seat inner securing portions 43h. As shown in FIG. 7, the console support bracket 60 (second securing portions 673b of the second support bracket 62 described later) is fastened to the weld nuts 44 by the fastening bolts T2.

As shown in FIGS. 9 and 10, the kick-up reinforcing element 50 includes a body member 51 joined to the kick-up front surface 9a of the kick-up portion 9 and the upper surface of the front floor panel 8 on the vehicle front lower side of the kick-up front surface 9a, and a cover member 52 removably provided on an upper surface of the body member 51.

As shown in FIGS. 9 to 11, the body member 51 has a substantially L-shaped vertical section along the vehicle front-rear direction, and a substantially hat-shaped vertical section along the vehicle-width direction that protrudes toward the vehicle upper side. In other words, the body member 51 has a substantially box shape opening on the vehicle lower side and the vehicle rear side.

More specifically, as shown in FIGS. 9 to 11, the body member 51 integrally includes an upper surface 51a formed substantially in the same position in the vehicle up-down direction as the lower end of the kick-up front surface 9a of the kick-up portion 9, a pair of left and right side walls 51b extending from opposite ends of the upper surface 51a in the vehicle-width direction toward the vehicle lower side, and a front wall 51c extending from a front end of the upper surface 51a toward the vehicle lower side, and has a substantially box shape covering the rear opening S2 in the front floor panel 8.

Further, the body member 51 includes extending portions from lower ends of the side walls 51b toward the vehicle-width-direction outer side like flanges, and an extending portion from a lower end of the front wall 51c toward the vehicle front side like a flange, which integrally form a substantially U-shaped flange 51d in plan view along the lower ends of the left and right side walls 51b and the lower end of the front wall 51c.

The upper surface 51a and the left and right side walls 51b of the body member 51 are joined to the kick-up front surface 9a of the kick-up portion 9, and the flange 51d is joined to the upper surface of the front floor panel 8.

As shown in FIGS. 9 and 11, weld nuts 53 into which fastening bolts T3 are threaded through openings provided on the vehicle front upper side are joined to inner surfaces of the side walls 51b of the body member 51. A rear part of the console support bracket 60 is fastened to the weld nuts 53 by the fastening bolts T3.

As shown in FIG. 10, the upper surface 51a has a substantially rectangular opening S3 in plan view in an area facing the selector switch 16a provided on an upper surface of the battery unit 16 and the rear opening S2 in the front floor panel 8. Further, as shown in FIGS. 9 and 11, four weld bolts 54 protruding toward the vehicle upper side are joined to the upper surface 51a around the opening S3. The weld bolts 54 co-fasten the rear part of the console support bracket 60 and the cover member 52.

On the other hand, as shown in FIGS. 9 and 10, the cover member 52 has a predetermined thickness in the vehicle up-down direction and is substantially flat to cover the opening S3 in the body member 51. As shown in FIGS. 10 and 11, the cover member 52 is co-fastened by the weld bolts 54 to the body member 51 with the rear part of the console support bracket 60 therebetween.

As shown in FIGS. 2 and 3, the console support bracket 60 connects the expanding member 14 of the front floor panel 8 and the kick-up reinforcing element 50 in the vehicle front-rear direction. As shown in FIGS. 1 to 4, the console support bracket 60 includes, in the vehicle interior of the electric vehicle 1, a first support bracket 61 that supports the center console front part 3A, and a second support bracket 62 that supports the shift lever 4 and the center console rear part 3B.

As shown in FIG. 5, the first support bracket 61 includes a bracket body 63 joined to the expanding member 14 of the front floor panel 8, and a reinforcement 64 that reinforces a rear part of the bracket body 63. As shown in FIGS. 4 and 5, the first support bracket 61 has substantially the same length in the vehicle front-rear direction as the expanding member 14 of the front floor panel 8.

Specifically, as shown in FIGS. 5 and 12, the bracket body 63 includes a pair of left and right bracket side walls 631 facing each other in the vehicle-width direction, and a bracket upper surface 632 connecting upper ends of the bracket side walls 631, and has a substantially gate shape in front view.

As shown in FIGS. 5 and 12, the bracket upper surface 632 is recessed toward the vehicle lower side, and has a recessed groove 632a extending in the vehicle front-rear direction substantially at the middle in the vehicle-width direction. The recessed groove 632a is recessed from a substantial middle to a rear end of the bracket upper surface 632 in the vehicle front-rear direction.

As shown in FIG. 4, in a vertical section of the bracket body 63 along the vehicle front-rear direction, the bracket upper surface 632 spaced apart from the rear wall 14b of the expanding member 14 on the vehicle front side with respect to the reinforcement 64 of the first support bracket 61 described later is connected to the rear wall 14b of the expanding member 14 via a connecting bracket 19 having a substantially Z-shaped section.

On the other hand, as shown in FIG. 5, the reinforcement 64 of the first support bracket 61 is joined to an inner surface of the rear part of the bracket body 63. As shown in FIGS. 5 and 12, the reinforcement 64 integrally includes a pair of left and right side surfaces 641 joined to upper parts of the bracket side walls 631 of the bracket body 63, and an upper surface 642 joined to the bracket upper surface 632 of the bracket body 63.

As shown in FIGS. 5 and 12, weld nuts 65 into which fastening bolts T4 are threaded through openings provided in the bracket side walls 631 of the bracket body 63 are welded to rear parts of the side surfaces 641 of the reinforcement 64 of the first support bracket 61. The front part of the second support bracket 62 is fastened to the weld nuts 65 by the fastening bolts T4.

Further, as shown in FIGS. 5 and 12, weld bolts 66 protruding toward the vehicle upper side are joined to a rear part of the upper surface 642 through openings provided in the bracket upper surface 632 of the bracket body 63 at a predetermined interval in the vehicle-width direction. The front part of the second support bracket 62 is fastened to the weld bolts 66.

As shown in FIG. 13, the second support bracket 62 includes a bracket body 67 connected to a rear part of the first support bracket 61, and a reinforcement 68 that reinforces a front part of the bracket body 67.

As shown in FIGS. 11 to 13, the bracket body 67 integrally includes a pair of left and right bracket side walls 671 facing each other in the vehicle-width direction, and a bracket upper surface 672 connecting upper ends of the bracket side walls 671 in the vehicle-width direction, and has a substantially gate-shaped vertical section along the vehicle-width direction that opens on the vehicle lower side.

As shown in FIG. 13, the left and right bracket side walls 671 are substantially flat with a longer length in the vehicle front-rear direction than in the vehicle up-down direction. Each bracket side wall 671 has a length in the vehicle up-down direction shorter than a length from the bracket upper surface 672 to the upper surface of the front floor panel 8 in the vehicle up-down direction.

Further, as shown in FIG. 13, a flange 673 extending on the vehicle-width-direction outer side is integrally formed with a lower end of the bracket side wall 671 from a front end to a rear end. The flange 673 includes, at a predetermined interval in the vehicle front-rear direction, a first securing portion 673a fastened to the upper surface of the first floor cross member 30, and a second securing portion 673b fastened to the upper surface of the second floor cross member 40, which further extend toward the vehicle-width-direction outer side as flanges.

As shown in FIGS. 11 to 13, the bracket side wall 671 has, near a front end, a bolt insertion hole 671a through which the fastening bolt T4 can be inserted, and has, near a rear end, a bolt insertion hole 671b through which the fastening bolt T3 can be inserted.

As shown in FIGS. 2 to 4, on a front part of the bracket upper surface 672 of the bracket body 67, the shift lever support bracket 5 that supports the shift lever 4 from the vehicle lower side, and the center console rear part 3B are fixedly placed in this order from the vehicle front side.

As shown in FIGS. 3 and 13, the bracket upper surface 672 has a substantially rectangular flat shape in plan view that has a substantially constant length in the vehicle-width direction and is long in the vehicle front-rear direction. Further, as shown in FIGS. 12 and 13, the bracket upper surface 672 is recessed toward the vehicle lower side continuously with the recessed groove 632a in the first support bracket 61, and has a recessed groove 672a extending in the vehicle front-rear direction substantially at the middle in the vehicle-width direction.

As shown in FIGS. 3 and 13, the recessed groove 672a in the bracket upper surface 672 has a length from a front end of the bracket upper surface 672 to the vicinity of the second securing portion 673b in the vehicle front-rear direction. The recessed groove 632a in the first support bracket 61 and the recessed groove 672a in the second support bracket 62 increase rigidity of the first support bracket 61 and the second support bracket 62, and are also formed as spaces in which a wire harness (not shown) routed along the vehicle front-rear direction in the vehicle interior is accommodated.

As shown in FIGS. 8, 12, and 13, the bracket upper surface 672 has, near a front end, two bolt insertion holes 672b through which the weld bolts 66 of the first support bracket 61 can be inserted, and has two bolt insertion holes 672c through which the weld bolts 36 of the fastening bracket 35 of the first floor cross member 30 can be inserted, substantially in the same position in the vehicle front-rear direction as the first securing portion 673a.

Further, as shown in FIGS. 11 and 13, the bracket upper surface 672 has, between the first securing portion 673a and the second securing portion 673b, a plurality of bolt insertion holes 672d through which weld bolts (not shown) provided on the standing bracket 70 for fastening the bracket body 67 to the standing bracket 70 can be inserted, and has, near a rear end, two bolt insertion holes 672e through which two weld bolts 54 on the vehicle front side among the four weld bolts 54 of the kick-up reinforcing element 50 can be inserted.

As shown in FIGS. 12 and 13, the reinforcement 68 of the second support bracket 62 is joined to an inner surface of the front part of the bracket body 67. As shown in FIGS. 12 and 13, the reinforcement 68 integrally includes a pair of left and right side surfaces 681 joined to the bracket side walls 671 of the bracket body 67, and an upper surface 682 joined to the bracket upper surface 672 of the bracket body 67, and forms a substantially gate shape in front view.

As shown in FIG. 12, in the console support bracket 60 having the above described configuration, a rear part of the bracket side wall 631 of the first support bracket 61 and a front part of the bracket side wall 671 of the second support bracket 62 are fastened by the fastening bolts T4, and a rear part of the bracket upper surface 632 of the first support bracket 61 and a front part of the bracket upper surface 672 of the second support bracket 62 are fastened by the weld bolts 66, and thus the first support bracket 61 and the second support bracket 62 are connected in the vehicle front-rear direction.

Further, the console support bracket 60 is connected to the expanding member 14 by the bracket side walls 631 and the bracket upper surface 632 of the first support bracket 61 being joined to the side walls 14a and the rear wall 14b of the expanding member 14, respectively.

In addition, as shown in FIG. 11, in the console support bracket 60, the bracket side walls 671 of the second support bracket 62 are fastened by the fastening bolts T3 to the side walls 51b of the kick-up reinforcing element 50, and the bracket upper surface 672 of the second support bracket 62 is co-fastened by the weld bolts 54 to the upper surface 51a of the kick-up reinforcing element 50 together with the cover member 52.

Thus, the console support bracket 60 connects the expanding member 14 of the front floor panel 8 and the kick-up reinforcing element 50 in the vehicle front-rear direction. Further, in the console support bracket 60, the bracket upper surface 672 of the second support bracket 62 is co-fastened by the weld bolts 36 to the fastening bracket 35 of the first floor cross member 30 together with the front part of the shift lever support bracket 5.

As shown in FIGS. 6 and 7, in the console support bracket 60, the first securing portion 673a of the second support bracket 62 is fastened by the fastening bolts T1 to the cross member reinforcing element 33 of the first floor cross member 30, and the second securing portion 673b of the second support bracket 62 is fastened by the fastening bolts T2 to the cross member reinforcing element 43 of the second floor cross member 40.

As described above, the lower vehicle-body structure of the electric vehicle 1 that uses output from the rotary electric machine as a drive force includes the pair of left and right side sills 7 extending in the vehicle front-rear direction, the substantially flat front floor panel 8 disposed between the side sills 7, the first floor cross member 30 and the second floor cross member 40 disposed on the upper surface of the front floor panel 8 and connecting the left and right side sills 7 in the vehicle-width direction, the pair of left and right floor frame lower portions 12 disposed on the front floor panel 8 and extending in the vehicle front-rear direction, the battery unit 16 disposed between the left and right floor frame lower portions 12 and on the vehicle lower side of the front floor panel 8, the kick-up portion 9 raised from the rear end of the front floor panel 8 toward the vehicle upper side, the rear floor panel 10 connected to the vehicle rear side of the kick-up portion 9, and the kick-up reinforcing element 50 connecting the substantial middle of the kick-up portion 9 in the vehicle-width direction and the front floor panel 8 in front of the substantial middle of the kick-up portion 9. This can ensure desired resistance to rear-end collision even if the tunnel of the front floor panel 8 is eliminated.

Specifically, the lower vehicle-body structure of the electric vehicle 1 includes the kick-up reinforcing element 50 connecting the kick-up portion 9 and the front floor panel 8 for reinforcement, thereby increasing support rigidity of the kick-up portion 9 against a load in the vehicle front-rear direction even if the tunnel is eliminated.

Thus, the lower vehicle-body structure of the electric vehicle 1 can prevent the rear floor panel 10 from being deformed to curve toward the vehicle upper side around the lower end of the kick-up portion 9 when a collision load is applied from the vehicle rear side. Thus, the lower vehicle-body structure of the electric vehicle 1 can ensure desired resistance to rear-end collision even if the tunnel of the front floor panel 8 is eliminated.

Further, the lower vehicle-body structure of the electric vehicle 1 includes the first floor cross member 30 and the second floor cross member 40 connecting the left and right side sills 7 in the vehicle-width direction, and thus can efficiently transfer, from one side sill 7 to the other side sill 7, a collision load from a vehicle lateral side. Thus, the lower vehicle-body structure of the electric vehicle 1 can increase rigidity of a vehicle interior floor surface against the collision load from the vehicle lateral side.

The kick-up reinforcing element 50 integrally includes the pair of left and right side walls 51b facing each other in the vehicle-width direction, the front wall 51c connecting the front ends of the side walls 51b, and the upper surface 51a connecting the upper ends of the side walls 51b, and the side walls 51b and the front wall 51c of the kick-up reinforcing element 50 are joined to the front floor panel 8. Thus, the lower vehicle-body structure of the electric vehicle 1 can stably ensure desired resistance to rear-end collision.

Specifically, the kick-up reinforcing element 50 includes the pair of left and right side walls 51b, the front wall 51c, and the upper surface 51a, and thus the lower vehicle-body structure of the electric vehicle 1 can increase rigidity of the kick-up reinforcing element 50 as compared to, for example, when the pair of left and right side walls 51b are not provided.

Further, the front wall 51c and the side walls 51b of the kick-up reinforcing element 50 are joined to the front floor panel 8, and thus the lower vehicle-body structure of the electric vehicle 1 can stably transfer the collision load from the vehicle rear side to the front floor panel 8. Thus, the lower vehicle-body structure of the electric vehicle 1 can further prevent deformation of the kick-up portion 9 due to the collision load from the vehicle rear side. Thus, the lower vehicle-body structure of the electric vehicle 1 can stably ensure desired resistance to rear-end collision.

The console support bracket 60 is provided that is long in the vehicle front-rear direction, and has the front part connected to the vehicle body and the rear part secured to the kick-up reinforcing element 50. Thus, the lower vehicle-body structure of the electric vehicle 1 can use the kick-up reinforcing element 50 as a support member that supports the rear part of the console support bracket 60. Thus, the lower vehicle-body structure of the electric vehicle 1 can eliminate the need to separately provide a support member that supports the rear part of the console support bracket 60, and ensure support rigidity of the console support bracket 60 that is long in the vehicle front-rear direction.

Further, the front part of the console support bracket 60 is connected to the vehicle body, and thus the lower vehicle-body structure of the electric vehicle 1 can transfer the collision load applied from the vehicle rear side to the kick-up reinforcing element 50, via the console support bracket 60 further to the vehicle front side.

Thus, the lower vehicle-body structure of the electric vehicle 1 can increase rigidity of the kick-up portion 9 against the collision load from the vehicle rear side by cooperation between the console support bracket 60 and the kick-up reinforcing element 50. Thus, the lower vehicle-body structure of the electric vehicle 1 can more stably ensure desired resistance to rear-end collision.

The console support bracket 60 has the substantially gate-shaped vertical section along the vehicle-width direction with the pair of left and right bracket side walls 671 facing each other in the vehicle-width direction, and the bracket side walls 671 of the console support bracket 60 are secured to the first floor cross member 30, the second floor cross member 40, and the side walls 51b of the kick-up reinforcing element 50. Thus, the lower vehicle-body structure of the electric vehicle 1 can reduce a length of each bracket side wall 671 of the console support bracket 60 in the vehicle up-down direction as compared to when the bracket side wall 671 is secured to the front floor panel 8. Thus, the lower vehicle-body structure of the electric vehicle 1 can reduce weight of the console support bracket 60 as compared to when the bracket side wall 671 is secured to the front floor panel 8.

The battery unit 16 includes the selector switch 16a that is located on the vehicle lower side of the kick-up reinforcing element 50 and switches between conduction with outside and interruption of the conduction, the front floor panel 8 includes the rear opening S2 that opens in the area facing the selector switch 16a of the battery unit 16, and the kick-up reinforcing element 50 includes the opening S3 that opens in the area of the upper surface 51a facing the rear opening S2, and the removable cover member 52 covering the opening S3. Thus, the lower vehicle-body structure of the electric vehicle 1 allows easy access to the selector switch 16a of the battery unit 16 simply by removing the cover member 52 of the kick-up reinforcing element 50. Thus, the lower vehicle-body structure of the electric vehicle 1 can ensure desired resistance to rear-end collision, and also increase maintainability of the electric vehicle 1.

The kick-up reinforcing element 50 includes the weld bolts 54 for mounting both the cover member 52 and the console support bracket 60. Thus, the lower vehicle-body structure of the electric vehicle 1 can use the weld bolts 54 both for mounting the cover member 52 and for mounting the console support bracket 60.

Thus, the lower vehicle-body structure of the electric vehicle 1 can eliminate the need to separately provide, on the kick-up reinforcing element 50, a mounting portion for mounting the console support bracket 60. Thus, the lower vehicle-body structure of the electric vehicle 1 can increase rigidity of the kick-up portion 9 against the collision load from the vehicle rear side without increasing the number of components.

For correspondence between the configuration of the present disclosure and the above described embodiment, the floor cross member of the present disclosure corresponds to the first floor cross member 30 and the second floor cross member 40 of the embodiment. Similarly, the floor frame corresponds to the floor frame lower portion 12, the kick-up reinforcing portion corresponds to the kick-up reinforcing element 50, the long member corresponds to the console support bracket 60, the side walls of the long member correspond to the bracket side walls 671 of the console support bracket 60, the floor panel opening corresponds to the rear opening S2, and the mounting portion corresponds to the weld bolt 54. However, the present disclosure is not limited to the configuration of the above described embodiment, but may encompass various embodiments.

For example, in the above described embodiment, the separately formed expanding member 14 is joined to the front part of the front floor panel 8, but not limited to this, the front part of the front floor panel 8 substantially at the middle in the vehicle-width direction may be expanded toward the vehicle upper side to integrally form the expanding member 14 with the front floor panel 8.

The kick-up reinforcing element 50 that connects the rear part of the front floor panel 8 and the kick-up portion 9 is separately formed, but not limited to this, the kick-up reinforcing element 50 may be integrally formed with the front floor panel 8 or the kick-up portion 9.

The first floor cross member 30 includes the middle member 31, the pair of left and right end members 32, and the cross member reinforcing element 33, but not limited to this, the middle member 31 and the left and right end members 32 may be integrally formed. Alternatively, the middle member 31 and the cross member reinforcing element 33 may be integrally formed, or the middle member 31, the pair of left and right end members 32, and the cross member reinforcing element 33 may be integrally formed.

The second floor cross member 40 includes the middle member 41, the pair of left and right end members 42, and the cross member reinforcing element 43, but not limited to this, for example, the middle member 41 and the left and right end members 42 may be integrally formed. Alternatively, the middle member 41 and the cross member reinforcing element 43 may be integrally formed, or the middle member 41, the pair of left and right end members 42, and the cross member reinforcing element 43 may be integrally formed.

The console support bracket 60 includes the first support bracket 61 and the second support bracket 62 fastened to each other, but not limited to this, the first support bracket 61 and the second support bracket 62 may be joined to each other. The console support bracket 60 includes the first support bracket 61 and the second support bracket 62, but not limited to this, the first support bracket 61 and the second support bracket 62 may be integrally formed.

The expanding member 14 as a front vehicle body and the kick-up reinforcing element 50 as a rear vehicle body are connected in the vehicle front-rear direction by the console support bracket 60 that supports the center console 3, the shift lever 4, and the shift lever support bracket 5, but not limited to this, the expanding member 14 and the kick-up reinforcing element 50 may be connected in the vehicle front-rear direction by a long member that transfers a load in the vehicle front-rear direction.

What is claimed is:
1. A lower vehicle-body structure of an electric vehicle that uses output from a rotary electric machine as a drive force, comprising:
 a pair of left and right side sills extending in a vehicle front-rear direction;
 a substantially flat front floor panel disposed between the side sills;

a floor cross member disposed on an upper surface of the front floor panel and connecting the left and right side sills in a vehicle-width direction;

a pair of left and right floor frames disposed on the front floor panel and extending in the vehicle front-rear direction;

a battery disposed between the left and right floor frames and on a vehicle lower side of the front floor panel;

a kick-up portion raised from a rear end of the front floor panel toward a vehicle upper side;

a rear floor panel connected to a vehicle rear side of the kick-up portion; and a kick-up reinforcing portion connecting a substantial middle of the kick-up portion in the vehicle-width direction and the front floor panel in front of the substantial middle of the kick-up portion.

2. The lower vehicle-body structure of an electric vehicle according to claim 1, wherein the kick-up reinforcing portion integrally includes a pair of left and right side walls facing each other in the vehicle-width direction, a front wall connecting front ends of the side walls, and an upper surface connecting upper ends of the side walls, and the side walls and the front wall of the kick-up reinforcing portion are joined to the front floor panel.

3. The lower vehicle-body structure of an electric vehicle according to claim 2, further comprising:

a long member that has a length extending in the vehicle front-rear direction, and has a front part connected to a vehicle body and a rear part secured to the kick-up reinforcing portion.

4. The lower vehicle-body structure of an electric vehicle according to claim 3, wherein the long member has a substantially gate-shaped vertical section along the vehicle-width direction with a pair of left and right side walls facing each other in the vehicle-width direction, and the side walls of the long member are secured to the floor cross member and the side walls of the kick-up reinforcing portion.

5. The lower vehicle-body structure of an electric vehicle according to claim 3, wherein the battery includes a selector switch that is located on the vehicle lower side of the kick-up reinforcing portion and switches between conduction with outside and interruption of the conduction, the front floor panel includes a floor panel opening that opens in an area facing the selector switch of the battery, and the kick-up reinforcing portion includes an opening that opens in an area of the upper surface facing the floor panel opening, and a removable cover member covering the opening.

6. The lower vehicle-body structure of an electric vehicle according to claim 5, wherein the kick-up reinforcing portion includes a mounting portion for mounting both the cover member and the long member.

7. The lower vehicle-body structure of an electric vehicle according to claim 4, wherein the battery includes a selector switch that is located on the vehicle lower side of the kick-up reinforcing portion and switches between conduction with outside and interruption of the conduction, the front floor panel includes a floor panel opening that opens in an area facing the selector switch of the battery, and the kick-up reinforcing portion includes an opening that opens in an area of the upper surface facing the floor panel opening, and a removable cover member covering the opening.

8. The lower vehicle-body structure of an electric vehicle according to claim 7, wherein the kick-up reinforcing portion includes a mounting portion for mounting both the cover member and the long member.

* * * * *